US009912383B2

(12) United States Patent
Kyogoku

(10) Patent No.: US 9,912,383 B2
(45) Date of Patent: Mar. 6, 2018

(54) NON-TRANSITORY STORAGE MEDIUM ENCODED WITH COMPUTER READABLE INFORMATION PROCESSING PROGRAM ALLOWING USE OF DATA IN STORAGE MEDIUM AMONG DIFFERENT APPLICATION PROGRAMS, INFORMATION PROCESSING APPARATUS, INFORMATION PROCESSING SYSTEM, AND METHOD OF CONTROLLING INFORMATION PROCESSING APPARATUS

(71) Applicant: NINTENDO CO., LTD., Kyoto-shi, Kyoto (JP)

(72) Inventor: Aya Kyogoku, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/833,765

(22) Filed: Aug. 24, 2015

(65) Prior Publication Data

US 2016/0315665 A1    Oct. 27, 2016

(30) Foreign Application Priority Data

Apr. 24, 2015    (JP) ................................ 2015-089449

(51) Int. Cl.
*H04B 5/00*    (2006.01)
*A63F 13/34*    (2014.01)
(Continued)

(52) U.S. Cl.
CPC ........... *H04B 5/0062* (2013.01); *A63F 13/31* (2014.09); *A63F 13/32* (2014.09); *A63F 13/34* (2014.09); *A63F 13/95* (2014.09); *G06F 9/542* (2013.01)

(58) Field of Classification Search
CPC ....... H04W 4/008; H04W 76/02; H01Q 21/28
(Continued)

(56) References Cited

U.S. PATENT DOCUMENTS 8,562,439 B2 * 10/2013 Shuman .................. A63F 13/10
463/42
8,764,571 B2 * 7/2014 Sarmenta ............ A63F 3/00643
463/43
(Continued)

FOREIGN PATENT DOCUMENTS

JP    2000-163524    6/2000
JP    2007-98029    4/2007
JP    2010-162078    7/2010

OTHER PUBLICATIONS

Kyogoku, U.S. Appl. No. 14/843,863, filed Sep. 2, 2015.
(Continued)

*Primary Examiner* — Vernal Brown
(74) *Attorney, Agent, or Firm* — Nixon & Vanderhye P.C.

(57) ABSTRACT

A non-transitory storage medium encoded with a computer readable information processing program, the information processing program causing a computer to function as a reading module which reads data from an information storage medium by establishing near field wireless communication with the information storage medium, a first processing module which executes a first application program generating second data with the use of first data read by the reading module, a writing module which writes the second data into the information storage medium by establishing near field wireless communication with the information storage medium, and a second processing module which executes a second application program different from the first application program with the use of the second data read by the reading module.

22 Claims, 33 Drawing Sheets

(51) Int. Cl.
    *A63F 13/31*     (2014.01)
    *A63F 13/32*     (2014.01)
    *A63F 13/95*     (2014.01)
    *G06F 9/54*     (2006.01)

(58) Field of Classification Search
    USPC ..................................................... 340/10.1
    See application file for complete search history.

(56) References Cited

U.S. PATENT DOCUMENTS

| | | |
|---|---|---|
| 2007/0238530 A1 | 10/2007 | Okada |
| 2008/0163055 A1 | 7/2008 | Ganz et al. |
| 2011/0143631 A1 | 6/2011 | Lipman et al. |
| 2012/0077593 A1 | 3/2012 | Sarnenta |
| 2013/0263154 A1 | 10/2013 | Ishihara |
| 2013/0324262 A1 | 12/2013 | Shimohata et al. |
| 2015/0038238 A1 | 2/2015 | Momose et al. |

OTHER PUBLICATIONS

Kyogoku, U.S. Appl. No. 14/843,872, filed Sep. 2, 2015.
European Search Report issued in Application No. 15182618 dated Mar. 18, 2016.
Office Action issued in U.S. Appl. No. 14/843,872 dated Apr. 18, 2016.
Office Action issued in co-pending U.S. Appl. No. 14/843,863 dated May 15, 2017, (20 pages).
Office Action issued in co-pending U.S. Appl. No. 14/843,863, dated Oct. 13, 2017, (14 pages).

\* cited by examiner (TYPE TY1)

APPLICATION A

APPLICATION B (1) READING OF DATA ⟶ (3) READING OF DATA
(2) WRITING OF DATA (TYPE TY2)

(TYPE TY3)

FIG.30
APPLICATION B 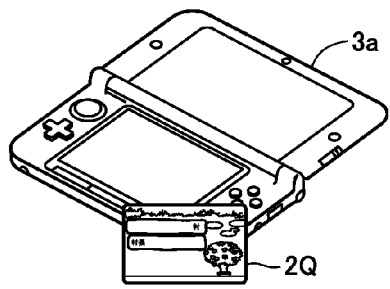 APPLICATION B 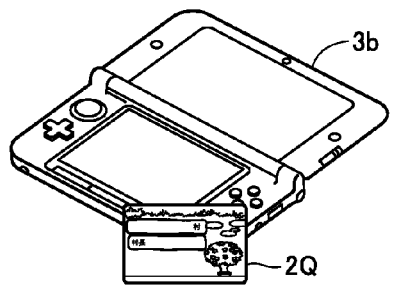
(1) READING OF DATA ⟶ (3) READING OF DATA
(2) WRITING OF DATA
FIG.31
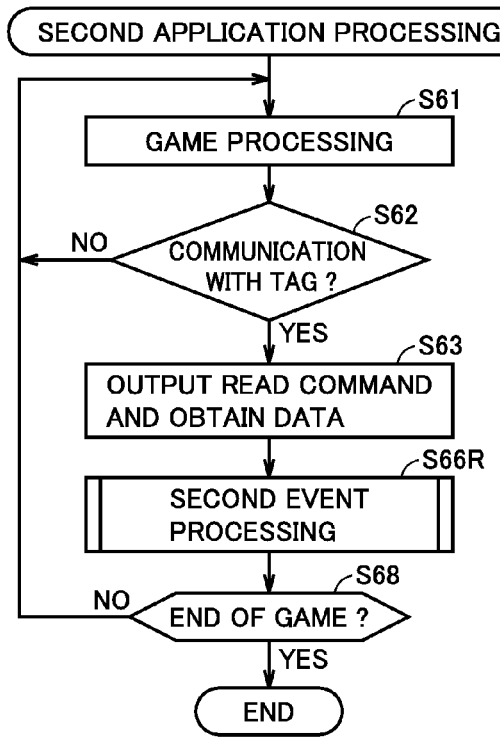

NON-TRANSITORY STORAGE MEDIUM ENCODED WITH COMPUTER READABLE INFORMATION PROCESSING PROGRAM ALLOWING USE OF DATA IN STORAGE MEDIUM AMONG DIFFERENT APPLICATION PROGRAMS, INFORMATION PROCESSING APPARATUS, INFORMATION PROCESSING SYSTEM, AND METHOD OF CONTROLLING INFORMATION PROCESSING APPARATUS

This nonprovisional application is based on Japanese Patent Application No. 2015-089449 filed with the Japan Patent Office on Apr. 24, 2015, the entire contents of which are hereby incorporated by reference.

FIELD

The present disclosure relates to information processing performed in a computer, and relates to a non-transitory storage medium encoded with a computer readable information processing program executed by a computer capable of near field wireless communication with an information storage medium, an information processing apparatus, an information processing system, and a method of controlling an information processing apparatus.

BACKGROUND AND SUMMARY

There has conventionally been a technique for communicating among apparatuses, for example, through near field wireless communication such as near field communication (NFC). In near field wireless communication, in response to a storage medium (what is called a tag) being closer to an information processing apparatus, communication is started between the information processing apparatus and the storage medium.

A type of a storage medium communicating with an information processing apparatus through near field wireless communication has conventionally been specified, and processing making use of a storage medium different in type has not been performed as processing of the same application program.

An object of the present disclosure is to provide a non-transitory storage medium encoded with a computer readable information processing program allowing use of data in the storage medium among different application programs, an information processing apparatus, an information processing system, and a method of controlling an information processing apparatus.

A non-transitory storage medium encoded with a computer readable information processing program according to one aspect of the present disclosureexecuted by a computer capable of near field wireless communication with an information storage medium, and the information processing program causes the computer to function as a reading module which reads data from the information storage medium by establishing near field wireless communication with the information storage medium, a first processing module which executes a first application program generating second data by using first data read by the reading module, a writing module which writes the second data into the information storage medium by establishing near field wireless communication with the information storage medium, and a second processing module which executes a second application program different from the first application program by using the second data read by the reading module.

In the exemplary embodiment, the first processing module generates as the second data, environmental data relating to the first data as a result of execution of the first application program.

In the exemplary embodiment, the environmental data is design data having a content displayed as a result of execution of the second application program.

In the exemplary embodiment, the environmental data is design data within a virtual space displayed as a result of execution of the second application program.

In the exemplary embodiment, the environmental data is data displayed in connection with a character arranged in a virtual space as a result of execution of the first application program.

In the exemplary embodiment, the environmental data is data representing a configuration of the virtual space.

In the exemplary embodiment, the first processing module generates the second data in response to an operation by a user as a result of the first application program.

In the exemplary embodiment, the first processing module accepts selection by the user as a result of execution of the first application program, and generates the second data in accordance with accepted selection.

In the exemplary embodiment, the first processing module accepts selection of a plurality of parts relating to a displayed content from the user as a result of execution of the first application program, and generates the second data in accordance with the selected parts.

In the exemplary embodiment, the first processing module generates as the second data, a part of data generated by using the first data as a result of execution of the first application program.

In the exemplary embodiment, the information storage medium is RFID.

In the exemplary embodiment, the information storage medium is an RF tag.

In the exemplary embodiment, the near field wireless communication is NFC wireless communication.

In the exemplary embodiment, the first application program and the second application program are game programs different from each other.

An information processing apparatus according to one aspect of the present disclosure is an information processing apparatus capable of near field wireless communication with an information storage medium, and includes a reading module which reads data from the information storage medium by establishing near field wireless communication with the information storage medium, a first processing module which executes a first application program generating second data by using first data read by the reading module, a writing module which writes the second data into the information storage medium by establishing near field wireless communication with the information storage medium, and a second processing module which executes a second application program different from the first application program by using the second data read by the reading module.

An information processing system according to one aspect of the present disclosure includes an information storage medium and an information processing apparatus capable of near field wireless communication with the information storage medium. The information processing apparatus includes a reading module which reads data from the information storage medium by establishing near field wireless communication with the information storage medium, a first processing module which executes a first application program generating second data by using first data read by the reading module, a writing module which writes the second data into the information storage medium by establishing near field wireless communication with the information storage medium, and a second processing module which executes a second application program different from the first application program by using the second data read by the reading module.

A method of controlling an information processing apparatus according to one aspect of the present disclosure is a method of controlling an information processing apparatus capable of near field wireless communication with an information storage medium, and includes the steps of reading data from the information storage medium by establishing near field wireless communication with the information storage medium, executing a first application program generating second data by using read first data, writing the second data into the information storage medium by establishing near field wireless communication with the information storage medium, and executing a second application program different from the first application program by using the read second data.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 30 is a diagram illustrating one example of another form of use of tag 2Q based on the third embodiment.

FIG. 31 is a flowchart illustrating second application processing based on a fourth embodiment.

DETAILED DESCRIPTION OF NON-LIMITING EXAMPLE EMBODIMENTS

Figure 1:
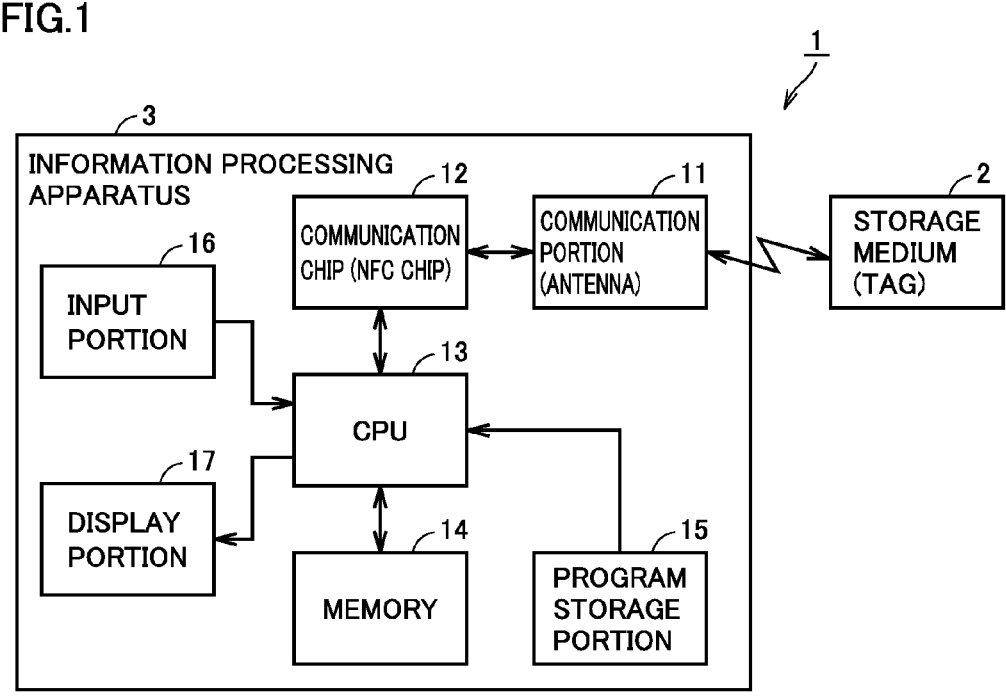
FIG. 1 is a diagram showing a configuration of one example of an information processing system based on the present first embodiment.

This embodiment will be described in detail with reference to the drawings. The same or corresponding elements in the drawings have the same reference characters allotted and description thereof will not be repeated.

(First Embodiment)

<Configuration of Information Processing System>

FIG. 1 is a diagram showing a configuration of one example of an information processing system based on the present first embodiment.

As shown in FIG. 1, an information processing system 1 includes a storage medium (a tag) 2 and an information processing apparatus 3. Information processing apparatus 3 is any information processing apparatus capable of establishing near field wireless communication with tag 2.

In the present first embodiment, a case that information processing apparatus 3 and tag 2 communicate with each other under NFC specifications is described by way of example of near field wireless communication. Here, near field wireless communication refers to a communication scheme in which radio waves (for example, electromagnetic induction) from one apparatus generate electromotive force in the other apparatus by way of example. The other apparatus can operate with generated electromotive force (the other apparatus may or may not have a power supply). In near field wireless communication, communication can be established when information processing apparatus 3 and tag 2 are proximate to each other (typically, a distance therebetween is not greater than ten and several centimeters). In near field wireless communication, sending of radio waves continues while communication between two communication apparatuses is maintained (while another tag is proximate to a communication apparatus). Though a scheme of communication through radio waves has been described by way of example, limitation thereto is not particularly intended. Optical communication or communication via other media may be applicable and a scheme is not limited.

Information processing apparatus 3 is any information processing apparatus which can establish near field wireless communication. In the present first embodiment, information processing apparatus 3 may be, for example, a portable (also referred to as mobile) device such as a portable game device, a portable telephone, or a smartphone, a stationary device such as a personal computer or a home game console, or a large apparatus such as an arcade game machine. For example, information processing apparatus 3 may be a portable device having an NFC reader and writer function.

Tag 2 is any device which can establish near field wireless communication with information processing apparatus 3. In the present first embodiment, tag 2 is a storage medium having a function as an NFC tag. Namely, the tag includes a circuit (an IC chip) establishing near field wireless communication and a storage portion for storing data (such as a memory). Namely, the tag is a radio frequency identification (RFID) including a circuit which allows reading and writing from and into the storage portion. Tag 2 may be a device having only a function to store data (an RF tag), or may be, for example, an information processing apparatus (a portable device) having an NFC card emulation function.

A configuration of information processing apparatus 3 will be described below. As shown in FIG. 1, information processing apparatus 3 includes a communication portion 11. Communication portion 11 is implemented by an antenna used for near field wireless communication. Information processing apparatus 3 includes a communication chip 12. Communication chip 12 generates a signal (radio waves) to be sent from communication portion 11 in response to an instruction from a CPU 13 which will be described later. The generated signal is sent from communication portion 11. Communication chip 12 is implemented, for example, by an NFC chip.

As shown in FIG. 1, information processing apparatus 3 includes CPU 13 and a memory 14. CPU 13 is an information processing portion for performing various types of information processing performed in information processing apparatus 3. CPU 13 performs the various types of information processing with the use of memory 14.

Information processing apparatus 3 includes a program storage portion 15. Program storage portion 15 stores various programs (including a communication program and an application program which will be described later) executed by information processing apparatus 3. Program storage portion 15 is any storage device (storage medium) which can be accessed by CPU 13. Program storage portion 15 may be implemented, for example, by a storage portion contained in information processing apparatus 3 such as a hard disk or a memory, a storage medium which can be attached to or removed from information processing apparatus 3 such as an optical disc or a cartridge, or both of the storage portion and the storage medium.

In the present first embodiment, in information processing apparatus 3, at least two types of programs of an application program and a communication program are stored in program storage portion 15. An application program is a program for executing any application communicating data with tag 2. The application program may be, for example, a game program performing game processing using game data by reading the game data from tag 2. A communication program is a program for establishing near field wireless communication with tag 2. For example, the communication program is firmware for operating communication chip 12, and may be prepared in advance in information processing apparatus 3 as a library. The communication program has communication chip 12 perform an operation to communicate in response to a command from an application. When a plurality of application programs can be executed in information processing apparatus 3, the communication program is commonly used among applications. Namely, the communication program (a communication control unit 32 which will be described later) can accept a command for communication from a plurality of applications.

Information processing apparatus 3 includes an input portion 16 accepting an instruction from a user, such as a button or a touch panel. Information processing apparatus 3 includes a display portion 17 displaying an image generated through information processing.

Information processing apparatus 3 may be implemented by a plurality of apparatuses. For example, information processing apparatus 3 may be configured in such a manner that an apparatus including communication portion 11 and communication chip 12 is removably connected to an apparatus including CPU 13 and memory 14. Information processing apparatus 3 may be implemented by a main body apparatus having CPU 13 and an apparatus having input portion 16 and/or display portion 17, which are separate from each other. For example, in another embodiment, information processing apparatus 3 may be implemented by a main body apparatus and a terminal apparatus having input portion 16 and display portion 17, or by a main body apparatus and an operation apparatus having input portion 16. Information processing apparatus 3 may employ a television as a display apparatus, without including display portion 17.

In another embodiment, at least a part of information processing performed in information processing apparatus 3 may be performed as distributed among a plurality of apparatuses capable of communicating over a network (a wide area network and/or a local network).

<Tag>

Figure 2:
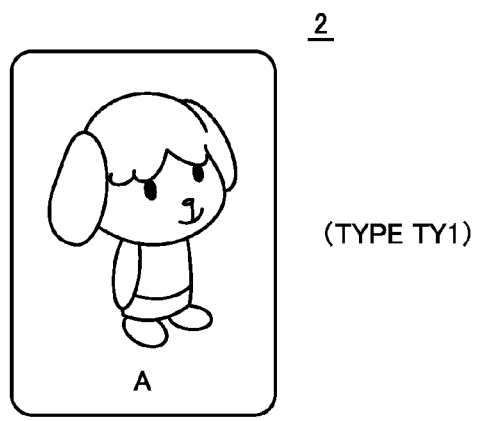
FIG. 2 is a diagram showing one example of an appearance of a tag 2 based on the first embodiment.

FIG. 2 is a diagram showing one example of an appearance of tag 2 based on the first embodiment.

As shown in FIG. 2, tag 2 in the present first embodiment is a card type tag having such an appearance that a picture of a character is depicted (a character is two-dimensionally represented).

A type TY1 is associated by way of example as the card type tag.

A character (a dog, A) represented by tag 2 is a character which appears in a specific application (for example, a game) which can be executed in information processing apparatus 3. A user uses this tag 2 so that prescribed event processing for having a character appear in a specific application can be performed. Namely, in execution of a program of the specific application, information processing apparatus 3 can have the character appear in a virtual space generated by the program of the application by using the data stored in tag 2. Tag 2 represents any object which appears in an application, and it represents an item in a game application without being limited to a character.

As set forth above, tag 2 is used in a specific application program. Tag 2 can store data which can be used in a specific application program.

Tag 2 can be used in a specific application program, while it may also be used in another application program. Tag 2 stores data which can be used in a specific application program, while it can also store data which can also be used in an application program other than the specific application program, although description will be given later.

A plurality of types of tag 2 can also be provided, in correspondence with a plurality of characters. Types of tag 2 can also be categorized into a general character and a special character. Processing to be performed may also be differed by categorizing the types of tag 2.

One example of data stored in tag 2 will be described below.

Figure 3:
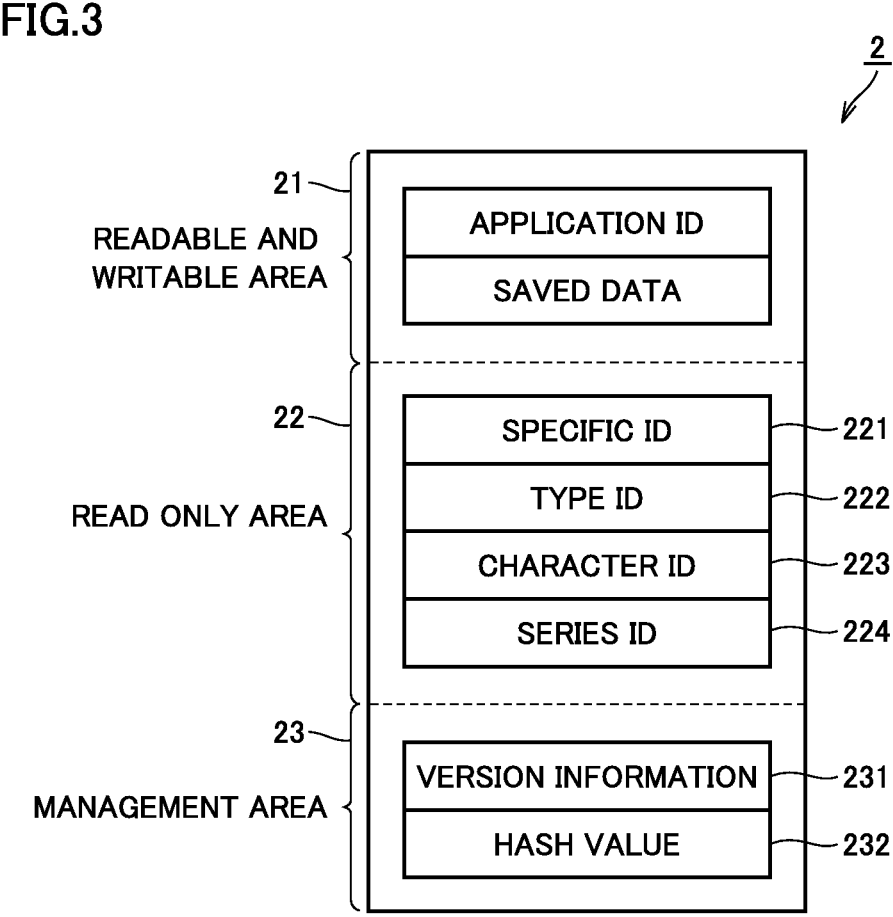
FIG. 3 is a diagram showing one example of data stored in the tag.

FIG. 3 is a diagram showing one example of data stored in a tag.

As shown in FIG. 3, tag 2 has a readable and writable area 21, a read only area 22, and a management area 23.

As shown in FIG. 3, readable and writable area 21 stores saved data saved as a result of execution of a specific application program. For example, various types of data relating to a character represented by tag 2, data indicating a state of progress of a game of a specific application program, and/or data on a player of the game of the specific application program is/are stored as saved data.

A plurality of pieces of saved data can be stored in readable and writable area 21. Specifically, saved data corresponding to each of a plurality of specific application programs can be stored. Therefore, an application ID identifying an application for associating the saved data and the specific application program with each other is registered together with the saved data.

Though a case that an application ID is registered together with saved data is described in the present example, a character ID below may be used for managing the saved data.

Initial registration data may be stored without being limited to the saved data. The initial registration data is data registered by a user when use of tag 2 is started in information processing apparatus 3. Though the initial registration data is typically stored in tag 2 at the timing of first use of tag 2, it may be stored in tag 2 at any timing. Namely, data may be registered in tag 2 by the user at any timing.

Read only area 22 is a storage area from which data can only be read. Read only area 22 is a storage area in which data is stored at the time of manufacturing of tag 2 and writing of data thereafter (after shipment of tag 2) is prohibited. Namely, information processing apparatus 3 (an application executed in information processing apparatus 3) cannot write data in read only area 22. On the other hand, information processing apparatus 3 (an application executed in information processing apparatus 3) can read and write data from and into readable and writable area 21. At the time of shipment of tag 2, data may or may not be stored in advance in readable and writable area 21. In any case, when tag 2 and information processing apparatus 3 communicate with each other, data is written and stored in readable and writable area 21 by information processing apparatus 3.

As shown in FIG. 3, though a storage area where each piece of data is stored (the readable and writable area, the read only area, and a management data area) is predetermined in the present first embodiment, it does not have to be determined in another embodiment.

At least data (information) as follows is stored in read only area 22.

(Data 221 representing) a specific ID
(Data 222 representing) a type ID
(Data 223 representing) a character ID
(Data 224 representing) a series ID A specific ID is identification information specific to a tag. Here, identification information specific to a tag which is called a unique ID (UID) is stored in an NFC tag such as tag 2 in the present first embodiment. The specific ID is information different from this UID. The specific ID is an ID provided separately from the UID such that a provider of service using tags can easily manage tags.

A character ID is identification information specific to a two-dimensionally represented character of card type tag 2. A character ID is identification information allowing unique identification of a type of a character of tag 2. For example, when a plurality of types of tag different in appearance (for example, different in pose or clothing) are provided for one character, a figure ID different in value is set for each tag. In this case, a figure ID may include an ID specific to the character and an ID indicating a difference in pose or clothing.

A series ID is identification information specific to a group to which an object (a character) represented by tag 2 belongs. For example, when a character represented by tag 2 appears in a plurality of types of application (for example, a series of game applications), the plurality of types of application may be set as one group and a group ID indicating this group may be set.

An application program which can be executed in information processing apparatus 3 includes information on a character ID of a tag which is (can be) used by the application program itself. When a value for the character ID included in the application program and a value for the character ID stored in the tag match with each other, determination as a specific application program is made in the present example by way of example. Though description will be given later, the specific application program performs event processing with the use of saved data stored in the tag in connection with a character corresponding to the character ID.

A type ID is identification information indicating a type of tag 2. In the present first embodiment, in information processing apparatus 3, in addition to the card type tag like tag 2, a figure type tag or a special card type tag can also be used. A type ID is identification information indicating whether a tag is a card type tag, a figure type tag, or a special card type tag. In another embodiment, a type of a tag which can be identified based on a type ID is arbitrary. For example, a different type ID may be provided for each operator which provides tag 2. In the present first embodiment, when a type ID stored in tag 2 and a type ID included in an application program match with each other, tag 2 is determined as accessible.

Management data will now be described. Management data is data used for management of a tag, and the management data is data basically not used in an application.

As shown in FIG. 3, tag 2 stores data on version information in management area 23 as management data. The version information indicates a version in connection with a data format (a storage format) of tag 2. Here, in the present first embodiment, a format of storage of data in tag 2 is different for each version, and a format of storage of data is the same if the version is the same. Specifically, in the present first embodiment, which data is stored at which address in tag 2 is determined for each version (an address where data on version information is stored is the same even though a version is different). Therefore, by referring to version information, information processing apparatus 3 can specify an address where each piece of data is stored. For example, by defining a data size of each piece of data (a size of a storage area for each piece of data) in version information, an address can be specified based on the version information.

Tag 2 stores a hash value as management data (see FIG. 3). The hash value is a hash value corresponding to data in readable and writable area 21 and read only area 22. The hash value is obtained by applying a prescribed algorithm (a hash function) to corresponding data. Though contents of data in read only area 22 do not change, contents of data in readable and writable area 21 change and hence a hash value changes. Data on the changed hash value is stored in management area 23.

In the present first embodiment, data shown in FIG. 3 is encrypted under a scheme decryptable by information processing apparatus 3 (in the present first embodiment, communication control unit 32 which will be described later). Therefore, even when other data is read from tag 2 by an apparatus not having a decryption function under the scheme above, the apparatus cannot decode the contents of data. Thus, security of data in tag 2 can be improved. In another embodiment, management data may also be encrypted under the scheme above, or at least one of three types of data does not have to be encrypted.

<Processing Operation in Information Processing System>

A processing operation (reading) in information processing system 1 based on the first embodiment will now be described.

Figure 4:
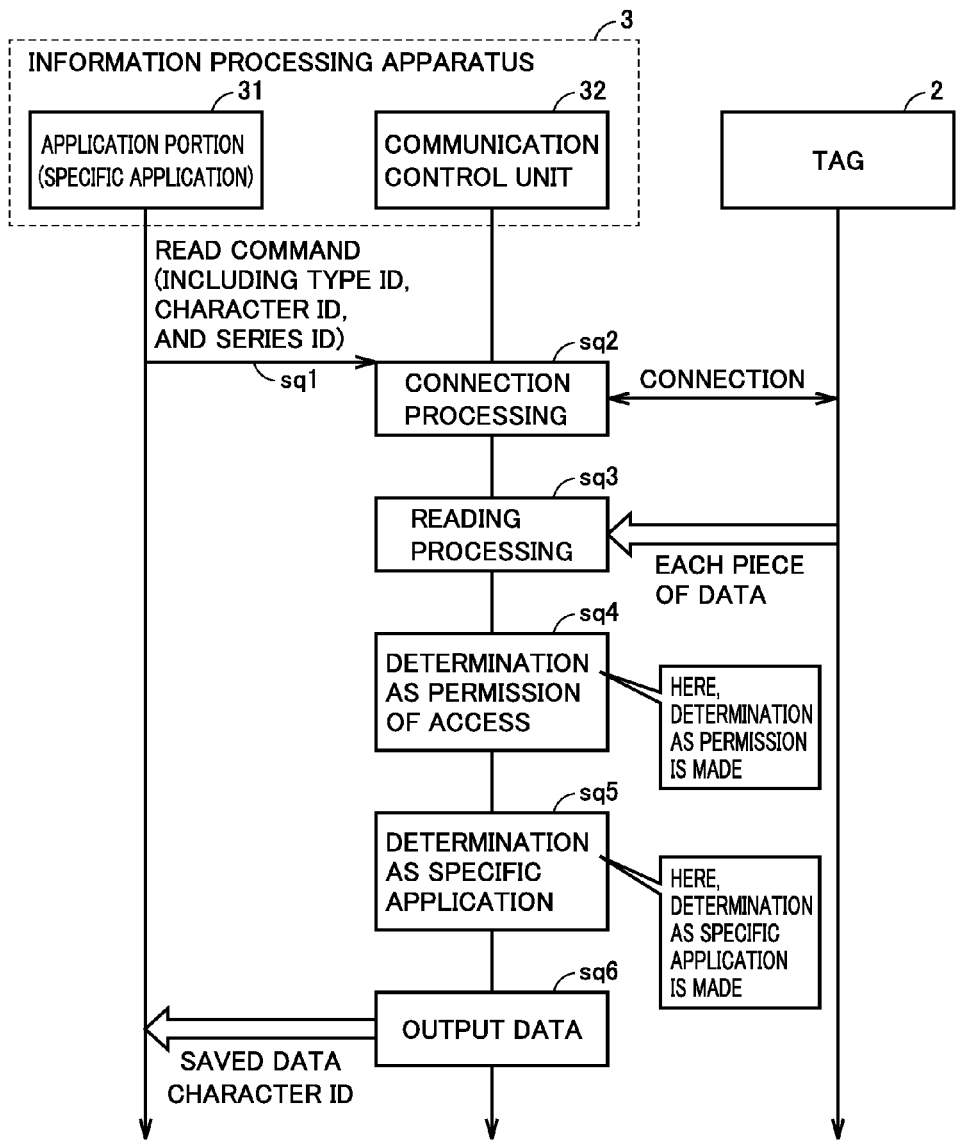
FIG. 4 is a diagram showing one example of a flow of processing in the information processing system in reading data from tag 2 based on the first embodiment.

FIG. 4 is a diagram showing one example of a flow of processing in the information processing system in reading data from tag 2 based on the first embodiment.

In the present first embodiment, an operation in information processing apparatus 3 will be described, with functional separation into an application portion 31 and communication control unit 32. In the present first embodiment, application portion 31 is implemented by CPU 13 executing the application program described above. Communication control unit 32 is implemented by CPU 13 executing the communication program described above and communication chip 12 and communication portion 11. In another embodiment, information processing in information processing apparatus 3 does not have to be implemented by two types of programs of an application program and a communication program, and may be implemented by a single program. FIG. 4 shows a case that a specific application program is executed in information processing apparatus 3, that is, CPU 13 executing a specific application program implements application portion 31.

As shown in FIG. 4, application portion 31 sends a command to read data from tag 2 to communication control unit 32 (processing sq1). In the present first embodiment, this read command includes a type ID, a character ID, and a series ID. A specific application program includes information on a type ID, a character ID, and a series ID of the tag of which saved data the specific application program itself can use. Therefore, application portion 31 sends, together with the read command, the type ID, the character ID, and the series ID included in the specific application program to communication control unit 32. A character ID is not limited to one type and a plurality of types of character IDs may be transmitted.

Application portion 31 sends each type ID included in the specific application program to communication control unit 32. When a type of a tag can be specified, however, application portion 31 may send only a type ID of the tag of one or more type IDs included in the specific application program to communication control unit 32. Similarly, when a type of a character can be specified, application portion 31 may send only one character ID of one or more character IDs included in the specific application program to communication control unit 32. For example, when data on a tag is read in a game status in which a tag representing a character corresponding to a character operated by a player is made use of, tag 2 connected to information processing apparatus 3 can be specified as a tag of that character. Therefore, in this case, application portion 31 may send only a character ID of a tag representing the character to communication control unit 32.

In another embodiment, application portion 31 may send a type ID, a character ID, and a series ID to communication control unit 32 at timing different from timing of sending of the read command (which is also the case with other commands such as a write command). For example, in another embodiment, in access permission determination processing which will be described later, communication control unit 32 may request of application portion 31 for a type ID, and application portion 31 may send the type ID to communication control unit 32 in response to this request. Similarly, in specific application determination processing, communication control unit 32 may request of application portion 31 for a character ID and application portion 31 may send the character ID to communication control unit 32 in response to this request. This is also the case with a series ID.

When a read command is accepted, communication control unit 32 starts execution of a series of processing (read command processing).

Specifically, communication control unit 32 performs connection processing for starting communication with tag 2 (processing sq2). Then, communication control unit 32 performs processing for reading data from tag 2 for which connection processing has been performed (processing sq3). Then, communication control unit 32 performs access permission determination processing based on the read data (processing sq4). Here, a case that determination as permission has been made is shown. Then, communication control unit 32 performs specific application determination processing (processing sq5). Here, a case that determination as a specific application has been made is shown. Then, communication control unit 32 outputs a character ID and saved data to application portion 31 (processing sq6).

Figure 5:
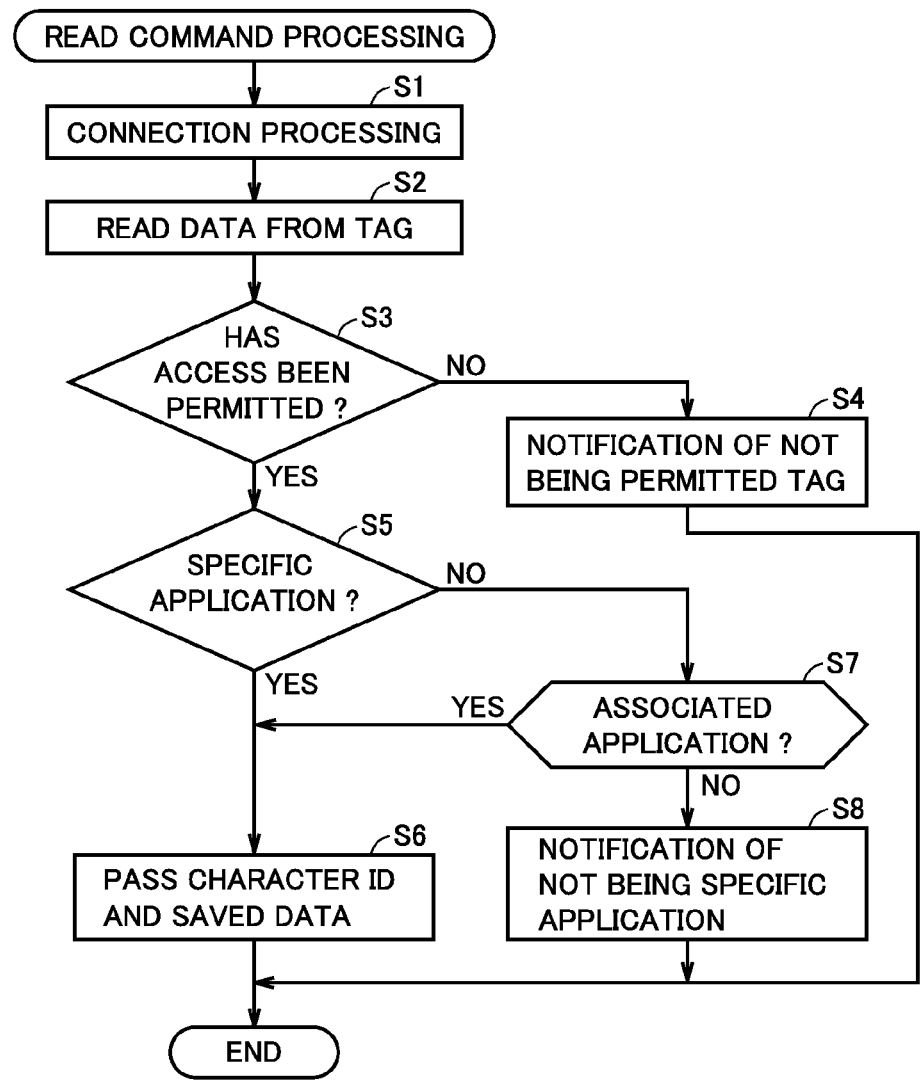
FIG. 5 is a flowchart illustrating processing (read command processing) in a communication control unit 32 when a read command is received based on the first embodiment.

FIG. 5 is a flowchart illustrating processing (read command processing) in communication control unit 32 when a read command is received based on the first embodiment.

Referring to FIG. 5, communication control unit 32 performs connection processing for starting communication with tag 2 (step S1). A specific content in connection processing is arbitrary. For example, communication control unit 32 performs processing for sensing tag 2 present around communication portion 11 (for example, polling processing) and processing for establishing communication with sensed tag 2 (for example, processing for obtaining information necessary for data communication from tag 2). Although not shown, when tag 2 moves away from information processing apparatus 3 and near field wireless communication is no longer established during the read command processing (which is also the case with write command processing which will be described later), communication control unit 32 quits the read command processing and aborts passing of data to application portion 31.

Then, communication control unit 32 performs processing for reading data (step S2). Specifically, communication control unit 32 initially reads management data from tag 2. Then, an address of each piece of data in tag 2 is specified based on version information included in the read management data. A specific method for specifying an address based on the version information is arbitrary. For example, information representing correspondence between each piece of data and an address may be included in the version information itself. Alternatively, for example, communication control unit 32 may store in advance a table in which correspondence and the version information are associated with each other, and communication control unit 32 may specify the correspondence by using the version information read from tag 2 and the table.

When an address of each piece of data is specified, communication control unit 32 reads a type ID from tag 2. Communication control unit 32 decodes the read data and has memory 14 store the data.

Then, communication control unit 32 performs access permission determination processing (step S3). The access permission determination processing is processing for determining whether or not access to a tag by an application program executed on information processing apparatus 3, with which communication has been established, is permitted. In other words, the access permission determination processing is processing for determining whether or not a tag is a tag to which access by the application program executed on information processing apparatus 3 has been permitted (hereinafter called a "permitted tag"). The "permitted tag" refers, for example, to a tag permitted by an operator which provides information processing apparatus 3 (and/or an application program which can be executed by information processing apparatus 3). Namely, in the present first embodiment, an application on information processing apparatus 3 can access only a tag permitted by the operator, and cannot read/write data from/into an NFC tag not permitted by the operator.

In the present first embodiment, determination in the access permission determination processing is made based on prescribed information stored in tag 2. For example, communication control unit 32 may have prescribed information which is stored in tag 2 stored in advance (also on a side of information processing apparatus 3) and make determination based on whether or not information read from the tag matches with the information stored in advance. Specifically, when a type ID read from tag 2 matches with a type ID sent from application portion 31, determination as a permitted tag is made. For the prescribed information used in this determination, in the present example, information representing a type of a tag (TY1 or TY2) determined under the NFC specifications which is stored in an NFC tag is made use of.

Without being limited as such, information (a dedicated code) indicating that a tag is permitted by an operator which provides information processing apparatus 3 (and/or an application program which can be executed by information processing apparatus 3) may be made use of.

Alternatively, the version information described above may be made use of. For example, determination in the access permission determination processing may be made based on whether or not data stored in read only area 22 is adapted to setting specified by the version information. Alternatively, for example, determination in the access permission determination processing may be made based on whether or not a size of prescribed data read by communication control unit 32 (for example, data stored in read only area 22) is within a prescribed range.

When communication control unit 32 determines in step S3 that tag 2 is not a permitted tag (NO in step S3), it notifies application portion 31 of that fact (step S4). Specifically, when a type ID read from tag 2 does not match with a type ID sent from application portion 31, determination as not being a permitted tag is made. Processing in application portion 31 which has received the notification is arbitrary. For example, application portion 31 notifies a user of the fact that data cannot be read because tag 2 is not permitted. After processing in step S4 ends, communication control unit 32 quits the read command processing (end).

When communication control unit 32 determines in step S3 that tag 2 is a permitted tag (YES in step S3), it performs specific application determination processing (step S5). Specifically, when a type ID read from tag 2 matches with a type ID sent from application portion 31, the specific application determination processing is performed. The specific application determination processing is processing for determining whether or not an application program which has issued a command to communication control unit 32 (here, a read command) is a specific application program.

Determination in the specific application determination processing is made by using the character ID described above. Namely, communication control unit 32 compares a character ID obtained together with the command from application portion 31 (when there are a plurality of character IDs, any of them) and a character ID read from tag 2 in step S2 with each other. When they match with each other, communication control unit 32 determines that the application program which has issued the command is a specific application program. When determination as the specific application program has been made (YES in step S5), communication control unit 32 outputs the character ID and saved data to application portion 31 (step S6). Namely, when the application program which has issued the command is a specific application program, communication control unit 32 permits reception of the character ID and the saved data. After processing in step S6 ends, communication control unit 32 quits the read command processing shown in FIG. 5 (end).

Application portion 31 which has received the character ID and the saved data from communication control unit 32 performs information processing using received data. Though a case that a character ID and saved data are output from communication control unit 32 to application portion 31 by way of example is described in the present example, limitation thereto is not particularly intended, and any one of them may be output, other data may be sent, or combination thereof may be applicable. Any data is applicable so long as the data is available in information processing.

Contents in this information processing are arbitrary. For example, application portion 31 performs game processing with the use of saved data. Though a specific application program uses saved data in the present first embodiment, processing using a character ID and a type ID together with saved data may be applicable.

When compared character IDs are different from each other, communication control unit 32 determines that the application program which has issued the command is a non-specific application program (an application program which is not a specific application program). When determination as not being a specific application program is made (NO in step S5), associated application determination processing is performed (step S7). Specifically, a series ID read from tag 2 is compared with a series ID sent from application portion 31. When they match with each other, communication control unit 32 determines that the application program which has issued the command is an associated application program. When determination as the associated application program has been made (YES in step S7), the communication control unit outputs a character ID and saved data to application portion 31 (step S6).

When the series ID read from tag 2 does not match with the series ID sent from application portion 31 (NO in step S7), communication control unit 32 determines that the application program which has issued the command is not an associated application program (also referred as an associated application). Then, communication control unit 32 notifies application portion 31 of the fact that the application program is not a specific application (step S8). Namely, when the application program which has issued the command is a non-specific application program except for an associated application, communication control unit 32 restricts (prohibits) reception of saved data. After processing in step S7 ends, communication control unit 32 quits the read command processing shown in FIG. 5 (end).

Though a case that saved data from communication control unit 32 is not transmitted when the application program which has issued the command is not a specific application is described in the present example, for example, only a character ID may be transmitted. Application portion 31 performs information processing using data on the received character ID. Though contents in this information processing are arbitrary, for example, processing for displaying a character represented by a character ID by using the character ID may be performed.

In the present first embodiment, in data output processing in step S6, communication control unit 32 outputs all saved data stored in tag 2 to application portion 31. In another embodiment, however, application portion 31 may designate data to be obtained in a read command, and communication control unit 32 may output data designated in the read command to application portion 31 in the processing in step S6. Here, when data designated in the read command is saved data and when it is determined in the processing in step S4 that the application program which has issued the read command is a non-specific application program, communication control unit 32 may notify in step S7, application portion 31 of the fact that output (reading) of data is restricted.

A processing operation (writing) in information processing system 1 based on the first embodiment will now be described.

Figure 6:
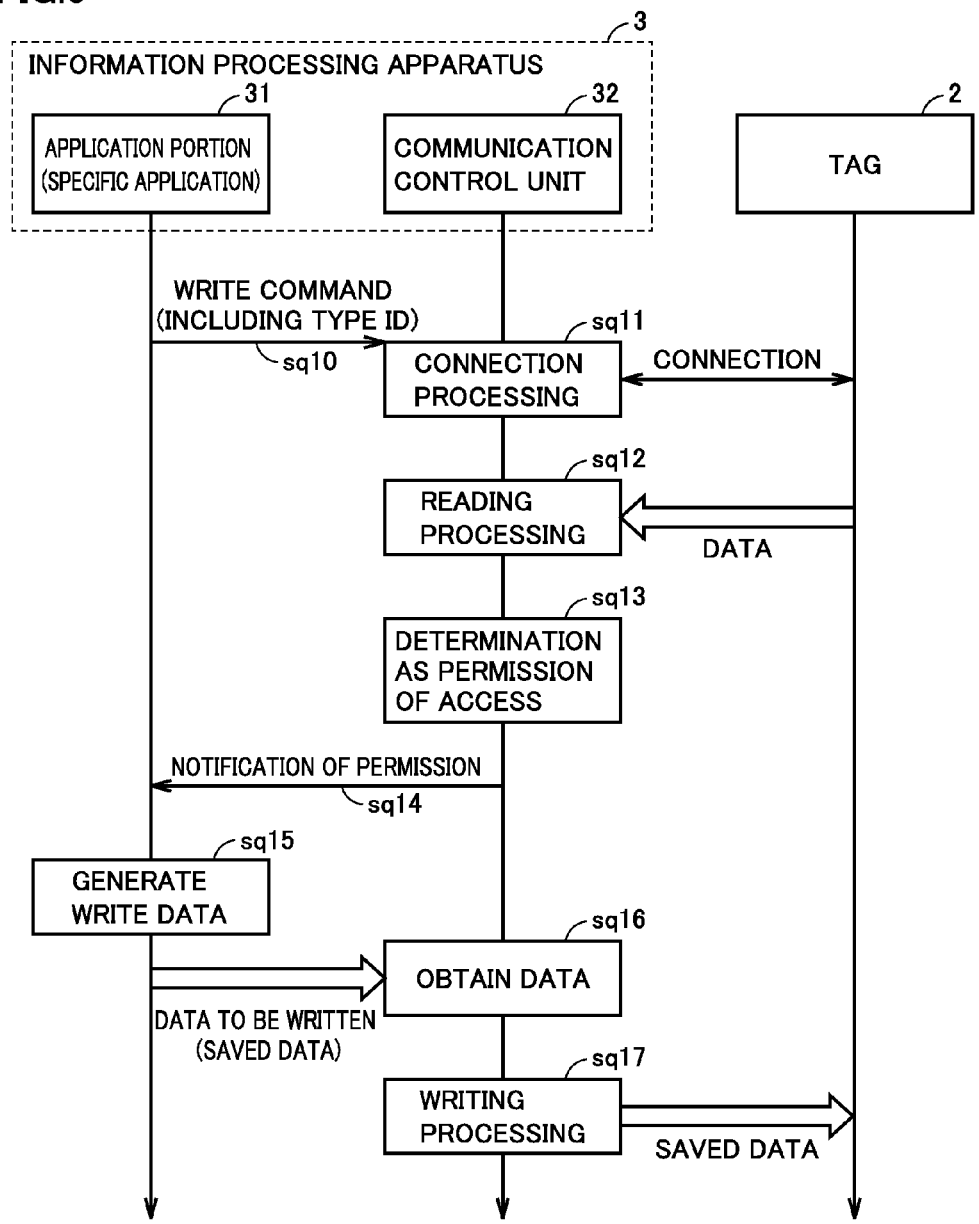
FIG. 6 is a diagram showing one example of a flow of processing in the information processing system in writing data into tag 2 based on the first embodiment.

FIG. 6 is a diagram showing one example of a flow of processing in the information processing system in writing data into tag 2 based on the first embodiment.

As shown in FIG. 6, application portion 31 sends a command to write data into tag 2 to communication control unit 32 (sq10). In the present first embodiment, this write command includes a type ID included in an application program of application portion 31, as in the read command described above. A specific application program includes information on a type ID of a tag in which the specific application program can have saved data saved. Therefore, application portion 31 sends a type ID included in a specific application program to communication control unit 32 together with the write command. The type ID is not limited to one type, and a plurality of types of type IDs may be transmitted.

When the write command is accepted, communication control unit 32 starts execution of a series of processing (write command processing).

Specifically, communication control unit 32 performs connection processing for starting communication with a tag (processing sq11). Then, communication control unit 32 processes reading of data from tag 2 for which connection processing has been performed (processing sq12). Then, communication control unit 32 performs access permission determination processing based on the read data (processing sq13). Here, a case that determination as permission has been made is shown. Then, communication control unit 32 outputs a permission notification to application portion 31 (processing sq14). Application portion 31 which has received the permission notification generates data to be written into tag 2 (here, saved data) and sends the data to communication control unit 32 (processing sq15). Communication control unit 32 obtains saved data from application portion 31 (processing sq16). Communication control unit 32 performs processing for writing into tag 2 in connection with the obtained saved data (processing sq17).

Figure 7:
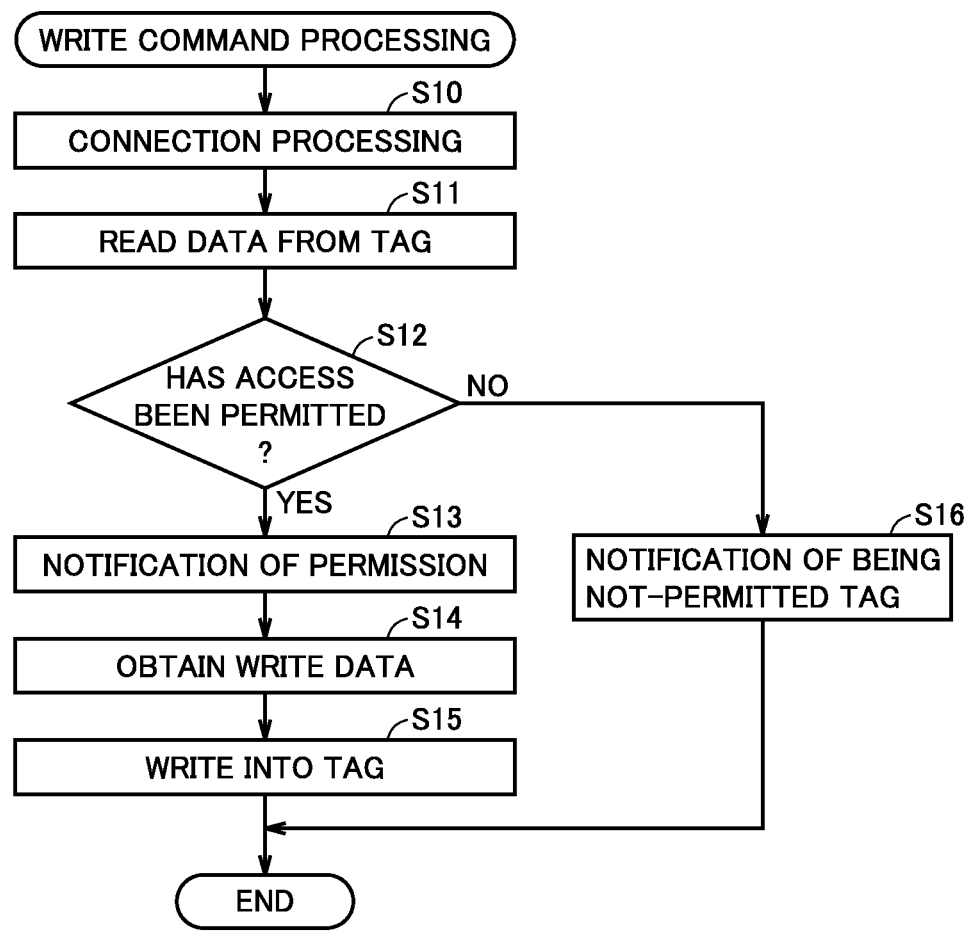
FIG. 7 is a flowchart showing one example of a flow of processing (write command processing) in communication control unit 32 when a write command is received based on the first embodiment.

FIG. 7 is a flowchart showing one example of a flow of processing (write command processing) in communication control unit 32 when a write command is received based on the first embodiment.

Referring to FIG. 7, communication control unit 32 performs connection processing for starting communication with tag 2 (step S10). Specific contents in the connection processing are arbitrary. For example, communication control unit 32 performs processing for sensing tag 2 present around communication portion 11 (for example, polling processing) and processing for establishing communication with sensed tag 2 (for example, processing for obtaining information necessary for data communication from tag 2). Although not shown, when tag 2 moves away from information processing apparatus 3 and near field wireless communication is no longer established during the write command processing, communication control unit 32 quits the write command processing and aborts passing of data to application portion 31.

Then, communication control unit 32 performs processing for reading data (step S11). Specifically, communication control unit 32 initially reads management data from tag 2. Then, an address of each piece of data in tag 2 is specified based on version information included in read management data. A specific method for specifying an address based on the version information is arbitrary. For example, information representing correspondence between each piece of data and an address may be included in the version information itself. Alternatively, for example, communication control unit 32 may have a table stored in advance, in which correspondence and the version information are associated with each other, and communication control unit 32 may specify the correspondence by using the version information read from tag 2 and the table.

When an address of each piece of data is specified, communication control unit 32 reads a type ID from tag 2.

Communication control unit 32 decodes the read data and has memory 14 store the data.

Then, communication control unit 32 performs access permission determination processing (step S12). The access permission determination processing is processing for determining whether or not access to a tag by an application program executed on information processing apparatus 3, with which communication has been established, is permitted.

When communication control unit 32 determines in step S12 that tag 2 is not a permitted tag (access to tag 2, writing in which has been indicated, is not permitted) (NO in step S12), a notification that a tag is a non-permitted tag is given (step S16). Communication control unit 32 notifies application portion 31 of the fact that data cannot be written. Processing in application portion 31 which has received this notification is arbitrary. For example, application portion 31 performs processing for notifying a user of the fact that connected tag 2 is a tag in which data cannot be written by an application which is being executed. After step S16, communication control unit 32 quits the write command processing (end).

When a result of determination is step S12 is affirmative in the write command processing (access to tag 2, writing in which has been indicated, is permitted) (YES in step S12), communication control unit 32 outputs a permission notification to application portion 31 (step S13).

Then, communication control unit 32 obtains data to be written into tag 2 from application portion 31 (step S14).

Then, communication control unit 32 performs processing for writing into tag 2 (step S15). As described above, in the present first embodiment, writing of data into tag 2 is carried out onto readable and writable area 21 in tag 2. Namely, communication control unit 32 has saved data written into tag 2, which has been obtained from application portion 31 in step S14. Here, communication control unit 32 has an application ID corresponding to the saved data written into tag 2 together with saved data. As a result of writing into tag 2, contents will be changed.

Therefore, in step S15, communication control unit 32 calculates a hash value for the changed saved data. Then, the calculated hash value is written in tag 2 as a new hash value. After processing in step S15, communication control unit 32 quits the write command processing (end).

In another embodiment, writing and reading of data into and from tag 2 may be carried out for each prescribed unit. For example, when a storage area of tag 2 is divided into a plurality of blocks, writing and reading of data into and from tag 2 may be carried out for each block.

Though a scheme in which processing for writing into tag 2 is permitted in a write processing command based on whether or not a type ID of tag 2 matches, that is, whether or not a tag is a tag to which access is permitted, has been described in the present example, limitation thereto is not particularly intended. For example, processing for writing into tag 2 may be permitted based on whether or not a character ID matches, that is, whether or not an application program is a specific application program, as in the read command processing. Other conditions may further be added.

Processing performed by CPU 13 (application portion 31) of information processing apparatus 3 by means of an application program (first application processing) will now be described.

Figure 8:
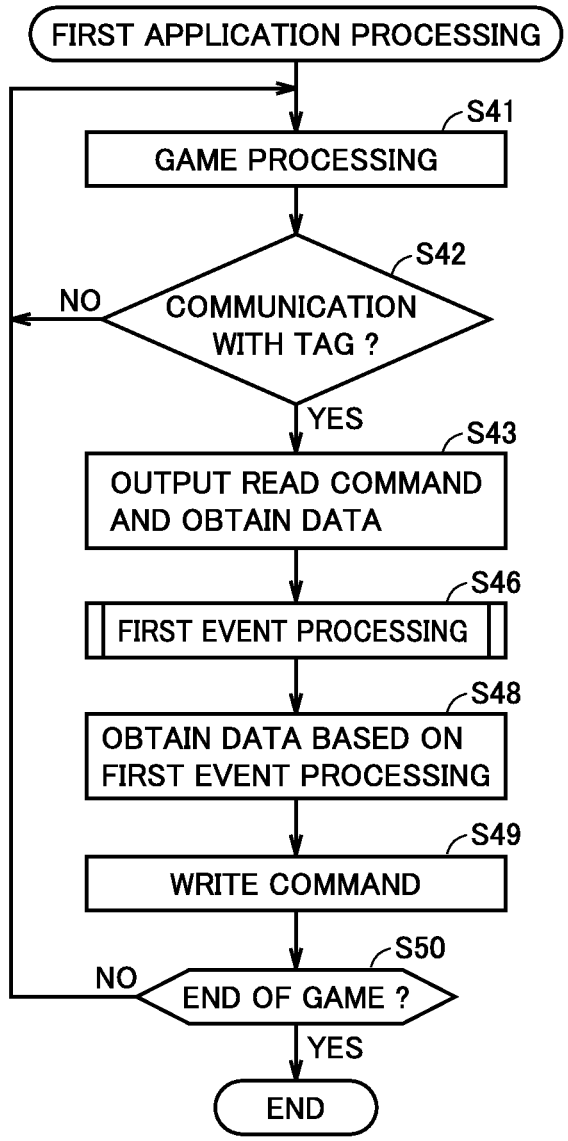
FIG. 8 is a flowchart illustrating processing performed by a CPU 13 by means of a first application program.

FIG. 8 is a flowchart illustrating processing performed by CPU 13 by means of a first application program. Processing shown in FIG. 8 is disclosed, for example, in response to an instruction to start up an application from a user.

FIG. 8 explains a case that game processing is performed by way of example of processing by the first application program. Event processing for having a character represented by tag 2 appear in a game space by using data (a character ID) stored in tag 2 is described by way of example.

In step S41, application portion 31 performs game processing in accordance with the first application program. Contents in this game processing are arbitrary, and for example, such processing as controlling an operation of a character in a virtual space (a game space) in response to an input by the user or controlling an operation of another character in accordance with an algorithm defined in the program is performed.

In step S42, application portion 31 determines whether or not to communicate with tag 2. Namely, application portion 31 determines whether or not a prescribed game condition for communicating with tag 2 has been satisfied. This prescribed game condition means such a game status that a character represented by tag 2 can appear, and includes, for example, such a game status that a player character has advanced to a prescribed stage or a player character has obtained a prescribed item.

Processing in step S42 is performed at appropriate timing while game processing in step S41 is performed.

Therefore, when a result in determination processing in step S42 indicates negative, processing in step S41 is performed again, and processing in steps S41 and S42 is repeatedly performed until the result in determination processing in step S42 is affirmative. When the result in determination processing in step S42 is affirmative, processing in step S43 which will be described later is performed.

In step S43, application portion 31 outputs a read command and reads data from tag 2. Namely, as described above, application portion 31 initially outputs the read command to communication control unit 32. In response thereto, communication control unit 32 communicates with tag 2 and passes the data read from tag 2 to application portion 31 in accordance with the flow described with reference to FIG. 5. Thus, application portion 31 obtains data from tag 2. When an application program being executed is a specific application program as described above, a character ID and saved data corresponding to the specific application program are obtained from tag 2. When there is no saved data which has been saved in tag 2, only a character ID is obtained.

Though not shown in FIG. 8, when connected tag 2 is not a permitted tag (the result in determination in step S3 is negative), a notification that tag 2 is not a permitted tag is sent from communication control unit 32 to application portion 31. In this case, for example, application portion 31 notifies the user of the fact that data cannot be read and game processing in step S41 is resumed.

In step S46, application portion 31 performs first event processing based on a character of a character ID obtained in step S43. Here, the application program includes data for generating each character which appears in the game owing to tag 2. The application program has information on a character ID associated with each character registered in advance.

Specifically, application portion 31 performs event processing which has the character represented by the character ID appear in the virtual space. Here, when application portion 31 knows the character represented by the character ID stored in tag 2 (the character ID has been registered in the application), application portion 31 can have the character appear in the virtual space by using information in its own application program. Namely, application portion 31 generates a character in the virtual space by using information in its own application program.

Details of the first event processing will be described later.

Then, data based on the first event processing is obtained (step S48).

Then, application portion 31 outputs a write command and has data written in tag 2. Namely, application portion 31 outputs the write command to communication control unit 32 (step S49). In response thereto, communication control unit 32 communicates with tag 2 and outputs data to be written from application portion 31 to communication control unit 32 in accordance with the flow described with reference to FIG. 7.

Then, data is written in tag 2 from communication control unit 32.

Then, whether or not the game has ended is determined (step S50).

When the game has ended in step S50 (YES in step S50), the process ends (end).

When the game has not ended in step S50 (NO in step S50), the process returns to step S41 and the game processing continues.

Figure 9:
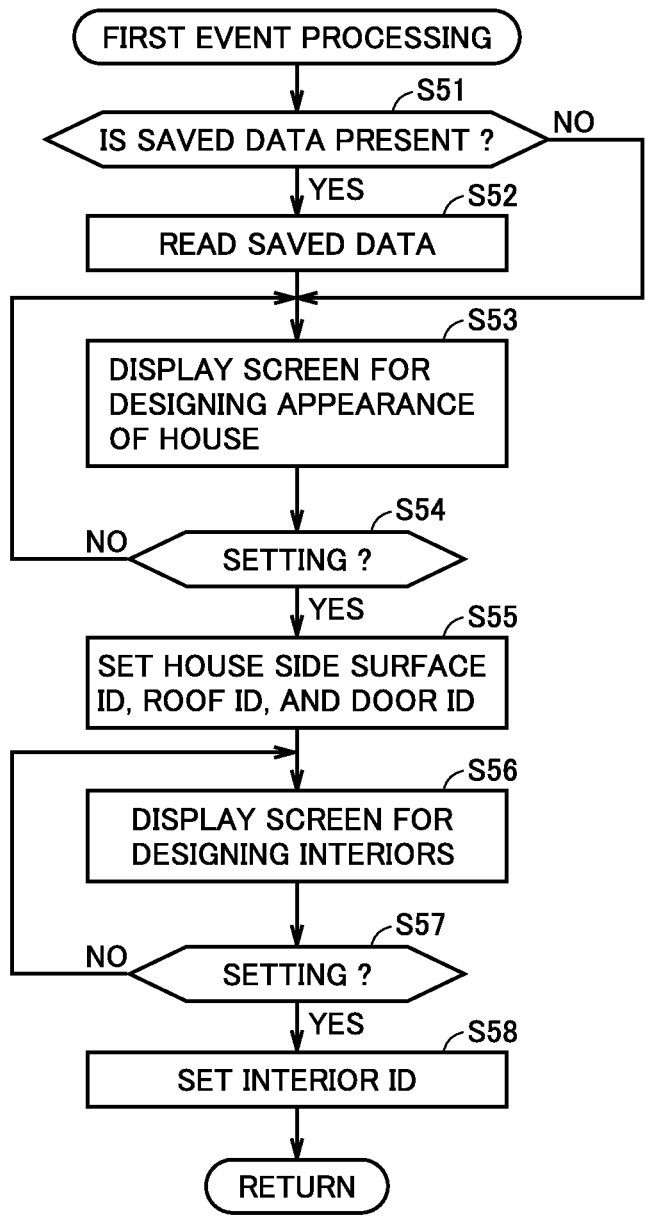
FIG. 9 is a flowchart illustrating first event processing.

FIG. 9 is a flowchart illustrating the first event processing.

As shown in FIG. 9, initially, whether or not there is saved data is determined (step S51). Specifically, when a character ID sent from communication control unit 32 and saved data are obtained, it is determined that there is saved data. When only the character ID is obtained at this time point, it is determined that there is no saved data.

When there are a plurality of pieces of saved data corresponding to a plurality of application programs respectively, saved data corresponding to a specific application program is obtained. Here, in order to obtain saved data corresponding to a specific application program which is being executed, at least one application ID is made use of. Whether or not there is saved data associated with an application ID which matches with an application ID of the specific application program is determined. When there is no saved data associated with an application ID which matches with an application ID of the specific application program, it is determined that there is no saved data. Though the description will be given later, an application ID of a specific application program is not limited to one type, and a plurality of types of application IDs may be used.

When it is determined in step S51 that there is saved data (YES in step S51), saved data corresponding to the specific application program is read in step S52.

When it is determined in step S51 that there is no saved data (NO in step S51), it is determined that there is no saved data, that is, determination as an initial state is made.

Then, a screen for designing an appearance of a house is displayed (step S53).

When there is saved data, the screen for designing an appearance of a house is displayed based on contents of saved data. When there is no saved data, the screen for designing an appearance of a house is displayed based on contents defined as the initial state.

Figure 10:
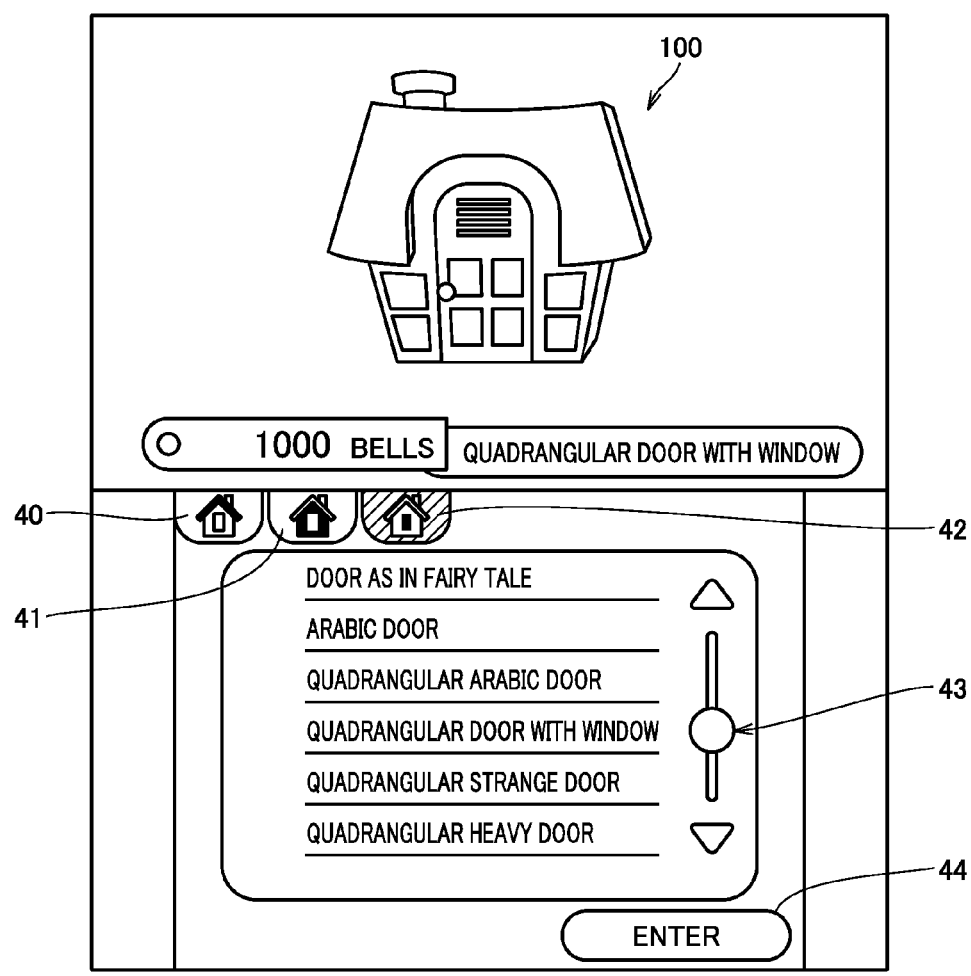
FIG. 10 is a diagram illustrating a screen for designing an appearance of a house by way of example.

FIG. 10 is a diagram illustrating the screen for designing an appearance of a house by way of example.

As shown in FIG. 10, the screen for designing an appearance of a house in the present example is a screen in which a user (an operator) can set design of an appearance of a house of a character corresponding to a character ID. The user (operator) can design any appearance of the house in accordance with user's preference (idea) through the screen.

In the present example, a selection screen in which a house model 100 in the virtual space is displayed in an upper portion of the screen and a part (a design component) necessary for designing the house model is selected in a lower portion of the screen is displayed.

In the present example, an appearance of house model 100 is divided into three parts. Specifically, division into a roof of the house, a side surface of the house, and a door is made.

In correspondence with design of the roof of the house, the side surface of the house, and the door, three tabs 40 to 42 are provided, and an appearance of the house for each part can be set by switching among tabs 40 to 42.

By selecting tab 40, switching to a screen in which a roof of the house can be selected is made.

By selecting tab 41, switching to a screen in which a side surface of the house can be selected is made.

By selecting tab 42, switching to a screen in which a door of the house can be selected is made.

In the present example, by way of example, a screen in which tab 42 is selected so that a part for the door of the house can be selected is shown. In the present example, a screen in which "door as in fairy tale" "Arabic door", "rectangular Arabic door," "rectangular door with window," "rectangular strange door," and "rectangular heavy door" different in shape of the door or the like can be selected is shown.

A slider 43 which can be operated vertically is provided, and a plurality of types of parts for the door of the house can vertically be scrolled by operating slider 43.

Then, by touching a text of the part for the door of the house displayed on the screen, that part can be designated through input portion 16 (touch panel).

In the upper portion of the screen, by way of example, house model 100 having the "rectangular door with window" as a result of designation is displayed.

Then, in the screen, an "enter" button 44 is provided, and by selecting "enter" button 44, design in the screen for designing an appearance of a house ends and next processing is performed.

For example, a setting screen in which interiors of the house can be designed is displayed so that setting can be made.

Referring again to FIG. 9, in step S54, whether or not setting has been made is determined. Specifically, whether or not various designs for an appearance of house model 100 have been made in the screen for designing an appearance of a house is determined. Namely, whether or not "enter" button 44 has been selected is determined. A state that various parts have been selected in advance for the appearance of the house may be set as the initial state.

When there is no setting, that is, setting has not been completed (NO in step S54), the process returns to step S53 and the processing above is repeated.

When it is determined that setting has been made (YES in step S54), a house side surface ID, a roof ID, and a door ID are set. An ID identifying a part is allocated in advance to a part designed in the screen for designing an appearance of a house (design data). Specifically, the house side surface ID, the roof ID, and the door ID are IDs identifying parts for displaying a house model (design data), and they are environmental data relating to representation of an appearance of the house model arranged in the virtual space. In other words, the environmental data is data representing a situation (an environment) in the virtual space. Specifically, the environmental data is data representing object representation (configuration) arranged in the virtual space. The environmental data is environmental data of the surroundings relating to a character, and different from character data (a parameter indicating strength).

Then, a screen for designing interiors is displayed (step S56).

Figure 11:
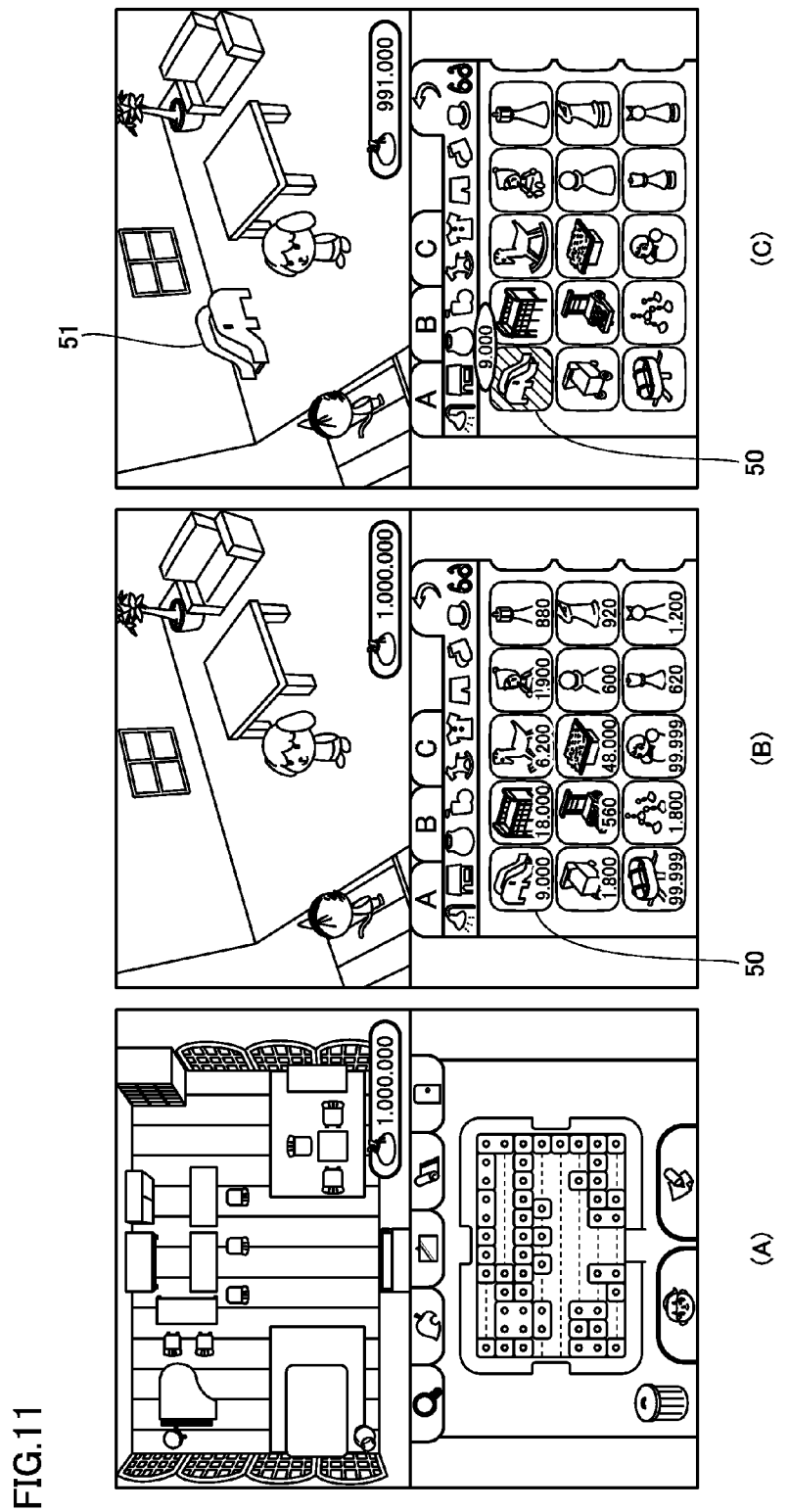
FIG. 11 is a diagram illustrating a screen in which interiors of a house can be designed.

FIG. 11 is a diagram illustrating a screen in which interiors of a house can be designed.

FIG. 11 (A) shows a screen in which edition such as modification or deletion of interiors can be made. Through the screen, the user (operator) can design interiors of any house in accordance with user's preference (idea). Specifically, arrangement of furniture can be modified or furniture can be deleted.

FIG. 11 (B) and (C) is a diagram illustrating addition of furniture in connection with a character corresponding to a character ID.

An upper portion of the screen in FIG. 11 (B) shows a case that a character object corresponding to a character ID is displayed in the house designed above. A lower portion of the screen shows a screen in which furniture to be arranged in the house is selected. Through the screen, the user (operator) can design interiors of any house in accordance with user's preference (idea).

In the present example, a state that a "slide" icon 50 by way of example of furniture is selected (purchased) in FIG. 11 (B) and a "slide" object is arranged in the house in FIG. 11 (C) is shown.

Referring again to FIG. 9, whether or not setting has been made is determined (step S57). Specifically, whether or not various designs relating to interiors of house model 100 have been made in the screen for designing interiors of the house is determined. Namely, whether or not a not-shown "enter" button has been selected is determined. A state that various parts have been selected in advance for interiors of the house may be set as the initial state.

When it is determined in step S57 that setting has not been made (NO in step S57), the process returns to step S56 and the processing above is repeated.

When it is determined in step S57 that setting has been made (YES in step S57), an interior ID is then be set (step S58).

Then, the process ends (return).

Figure 12:
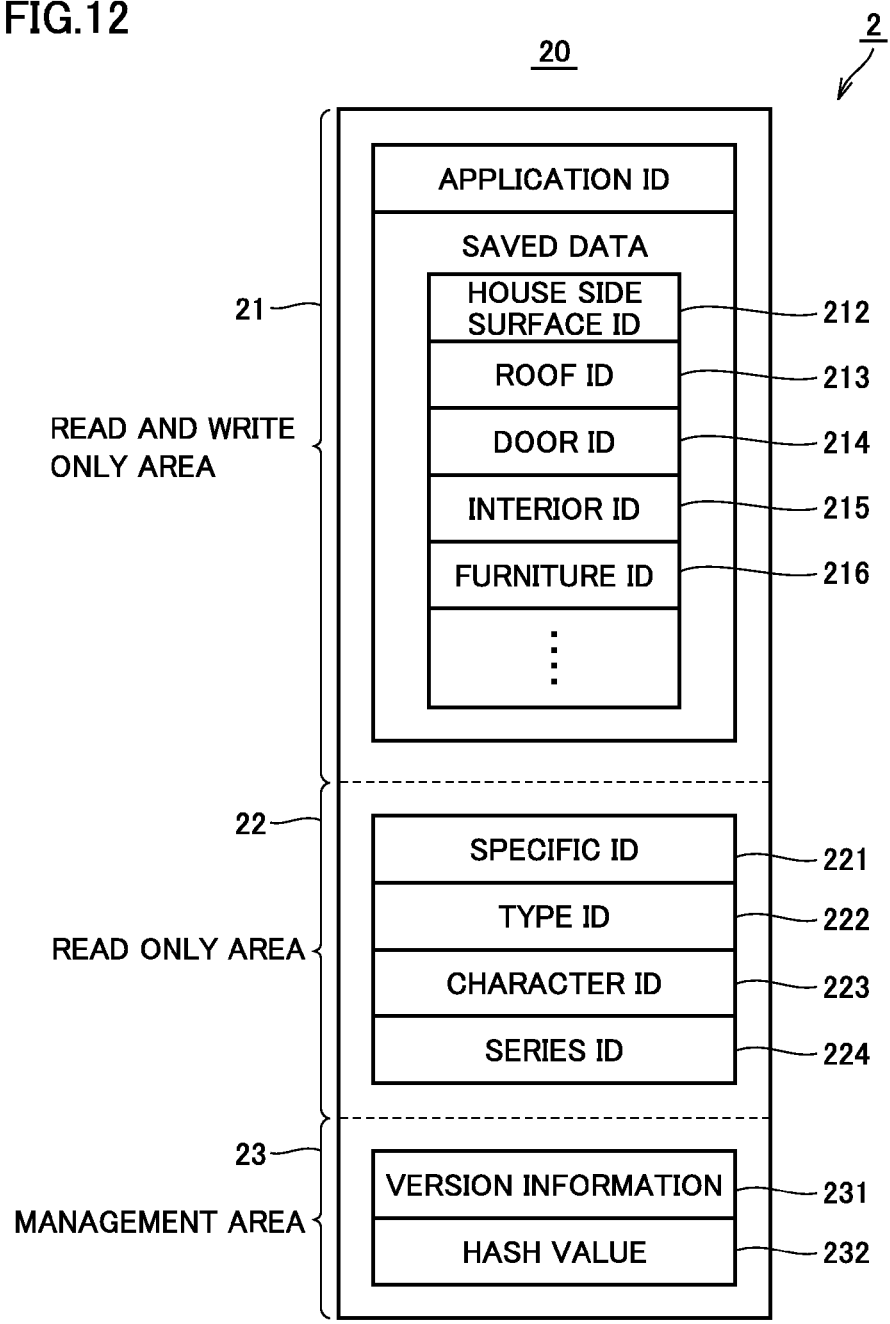
FIG. 12 is a diagram illustrating another example of data stored in tag 2.

FIG. 12 is a diagram illustrating another example of data stored in tag 2.

As shown in FIG. 12, contents in saved data are specifically shown as compared with data stored in tag 2 in FIG. 3.

Specifically, a house side surface ID (data 212), a roof ID (data 213), a door ID (data 214), an interior ID (data 215), and a furniture ID (data 216) which define objects of an appearance and interiors of the house are stored. In executing an application program by making use of the saved data, a house model set based on the saved data can be displayed in the virtual space.

By performing again the first event processing based on the saved data, design of the house model can again be made. Data stored in tag 2 can be updated by designing the house model again.

Figure 13:
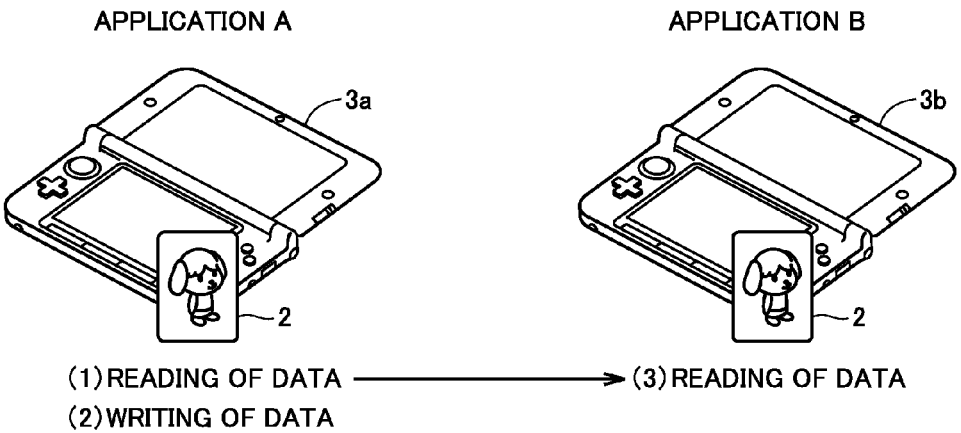
FIG. 13 is a diagram illustrating one example of a form of use of tag 2 based on the first embodiment.

FIG. 13 is a diagram illustrating one example of a form of use of tag 2 based on the first embodiment.

As shown in FIG. 13, in the present example, (1) data in tag 2 is read in accordance with an application program A (an application A). Then, (2) data is written in tag 2 in accordance with application program A (application A). Then, in the present example, (3) data in tag 2 is read in accordance with an application program B (an application B) different from application program A (application A). In the present first embodiment, a case that data written in tag 2 in accordance with application A is made use of in application B will be described.

Processing performed by CPU 13 (application portion 31) of information processing apparatus 3 by means of an application program (second application processing) will now be described.

Figure 14:
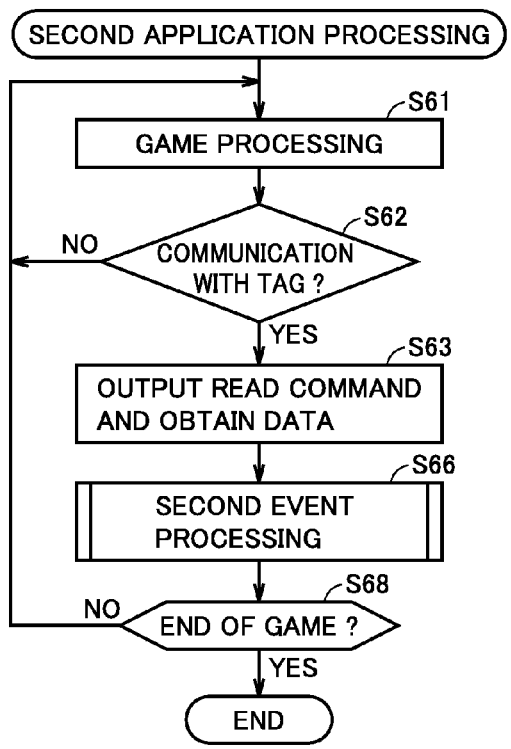
FIG. 14 is a flowchart illustrating processing performed by CPU 13 by means of a second application program.

FIG. 14 is a flowchart illustrating processing performed by CPU 13 by means of a second application program. Processing shown in FIG. 14 is disclosed, for example, in response to an instruction to start up of an application program from a user.

FIG. 14 explains a case that game processing is performed by way of example of processing by the second application program. Event processing for having a character represented by tag 2 appear in a game space by using data (a character ID) stored in tag 2 is described by way of example.

In steps S61 to S63, processing similar to those described with reference to steps S41 to S43 in FIG. 8 is performed. In step S63, application portion 31 outputs a read command and reads data from tag 2. Namely, as described above, application portion 31 initially outputs a read command to communication control unit 32. In response thereto, communication control unit 32 communicates with tag 2 and passes data read from tag 2 to application portion 31 in accordance with the flow described with reference to FIG. 5. Thus, application portion 31 obtains data from tag 2. When an application program being executed is a specific application program as described above, a character ID and saved data corresponding to a specific application program are obtained from tag 2. When there is no saved data which has been saved in tag 2, only a character ID is obtained.

In step S66, application portion 31 performs second event processing based on a character of a character ID obtained in step S63. Here, the application program includes data for generating each character which appears in the game owing to tag 2. The application program has information on a character ID associated with each character registered in advance.

Details of second event processing in step S66 will be described later.

Specifically, application portion 31 performs event processing for having a character represented by a character ID appear in the virtual space. Here, when application portion 31 knows the character represented by the character ID stored in tag 2 (the character ID has been registered in the application), application portion 31 can have the character appear in the virtual space by using information in its own application program. Namely, application portion 31 generates a character in the virtual space with the use of information in its own application program.

Then, whether or not the game has ended is determined (step S68).

When the game has ended in step S68 (YES in step S68), the process ends (end).

When the game has not ended in step S68 (NO in step S68), the process returns to step S61 and the game processing continues.

Figure 15:
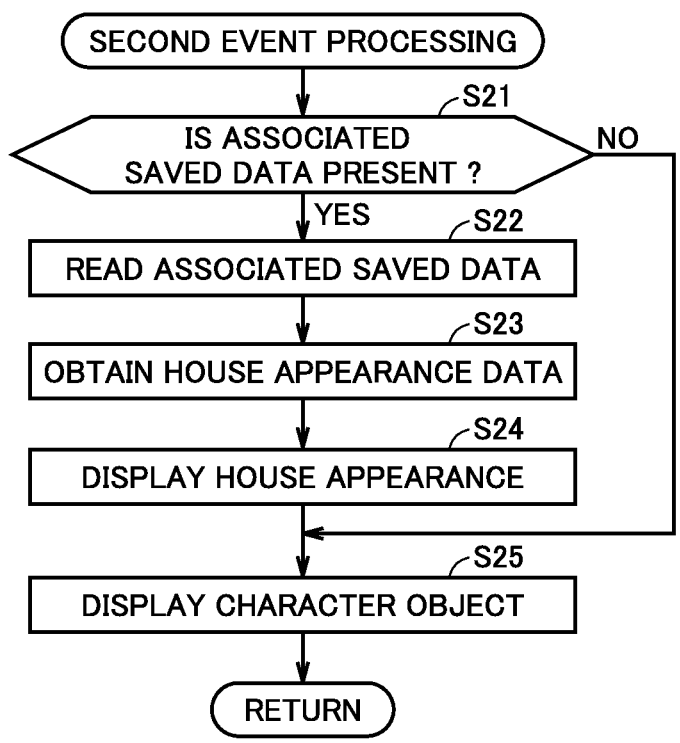
FIG. 15 is a flowchart illustrating second event processing based on the first embodiment.

FIG. 15 is a flowchart illustrating second event processing based on the first embodiment.

As shown in FIG. 15, initially, whether or not there is associated saved data is determined (step S21). Specifically, when application portion 31 obtains a character ID sent from communication control unit 32 and saved data, it determines whether or not there is saved data of an application program different from (associated with) the application program which is currently being executed. When only the character ID is obtained at this time point, it is determined that there is no associated saved data.

Application portion 31 determines whether or not there is saved data corresponding to an application ID of the associated application program. Information on an associated application ID has been stored in advance in an application program. Application portion 31 determines whether or not there is saved data associated with an application ID matching with an application ID (associated application ID) associated with a specific application program which is being executed.

When it is determined in step S21 that there is no saved data associated with an application ID matching with the associated application ID of the associated application program (NO in step S21), it is determined that there is no associated saved data.

In this case, the process proceeds to step S25 and processing for displaying a character object represented by a character ID is performed (step S25).

Then, the process ends (return). Though the description will be given later, an associated application ID of an associated application program is not limited to one type, and a plurality of types of application IDs may be used.

When it is determined in step S21 that there is associated saved data (YES in step S21), saved data corresponding to the associated application program is read.

Then, house appearance data included in the associated saved data is obtained (step S23).

Specifically, a house side surface ID, a roof ID, and a door ID representing partial data included in the associated saved data are obtained. A type of the obtained partial data is set in advance.

Then, an appearance of the house is displayed based on the obtained house appearance data (step S24). A specific application program which is being executed includes a generation program for displaying an appearance of the house based on the house side surface ID, the roof ID, and the door ID which are included in the associated saved data.

Then, the process proceeds to step S25 and processing for displaying a character object represented by a character ID is performed (step S25).

Then, the process ends (return).

Figure 16:
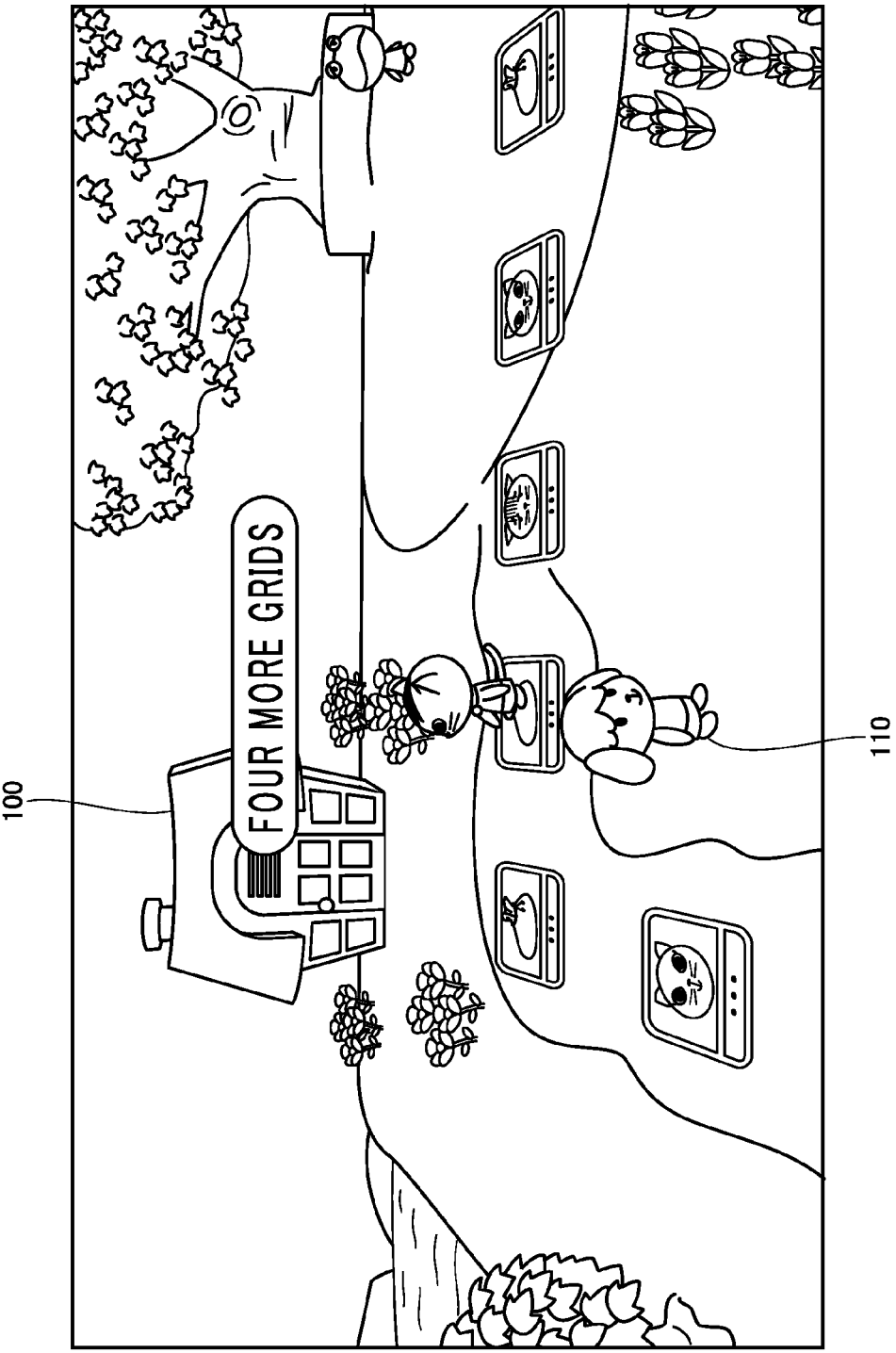
FIG. 16 is a diagram illustrating a case that an appearance of a house is displayed by way of example based on the first embodiment.

FIG. 16 is a diagram illustrating a case that an appearance of a house is displayed by way of example based on the first embodiment.

As shown in FIG. 16, in the present example, house model 100 is displayed in the virtual space based on the house appearance data included in the associated saved data. Here, a game screen while an application program executing a sugoroku game is executed is displayed. In the game screen, a plurality of grids used for progress of the sugoroku game are arranged. The sugoroku game proceeds as a character operated by a user advances through grids in accordance with a pip (number) of sugoroku which appears in response to an operation by the user. By way of example, a character operated by the user can advance through four grids in accordance with a representation "four more grids." In the second event processing in the present example, house model 100 is displayed as an object in the virtual space of the game based on the associated saved data. The object is an object for which an operation or an instruction from a user cannot be accepted (an operation-unacceptable object), and it does not become a factor affecting progress of the game. The object is used only for a background image in the virtual space.

Information processing apparatus 3 based on the present first embodiment performs processing by making use of data stored in tag 2 processed with application A, in execution of the second application program (application B) different from the first application program (application A). Through the processing, processing higher in data versatility owing to use of data in a storage medium (tag) between different application programs can be performed. Thus, versatile use of tag 2 is allowed and various forms of use can be applied.

Information processing apparatus 3 based on the present first embodiment performs processing for displaying an object not affecting progress of the game, as the second event processing in execution of the second application program (application B) different from the first application program (application A). For example, house model 100 is displayed as an object in the game screen. Namely, processing not changing a game parameter (for example, a parameter of strength of a character) which will affect progress of the game is performed.

A character object 110 represented by a character ID (an operation-unacceptable object) is displayed as an object in the game screen which does not affect progress of the game.

The second event processing is event processing making use only of data processed with the first application program (application A) stored in tag 2, and data processed with the first application program (application A) stored in tag 2 is not updated.

(Modification of Appearance of Tag)

In the first embodiment, though a card type tag on which a picture of a character is depicted (a character is two-dimensionally represented) is described as tag 2, a figure type tag three-dimensionally representing a character may be applicable. A shape of the tag is not limited as such and any shape is applicable. Thus, a user can readily recognize an object which can appear in an application by using tag 2. When the object is displayed on display portion 17, a user can experience such feeling as if a real object entered and appeared in the virtual space, and zest of an application can be improved.

(Second Embodiment)

A case that processing is different depending on a tag different in type for the same application program will be described in a second embodiment. Specifically, a case that processing is different in the second application processing depending on a type of a tag will be described. The first application processing is the same, regardless of a type of a tag.

Figure 17:
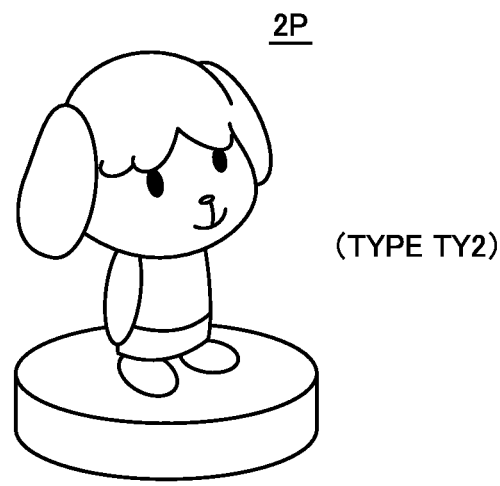
FIG. 17 is a diagram showing one example of an appearance of a tag 2P based on a second embodiment.

FIG. 17 is a diagram showing one example of an appearance of a tag 2P based on the second embodiment.

As shown in FIG. 17, tag 2P in the present embodiment is a figure type tag which three-dimensionally represents a character.

A type TY2 is associated by way of example as the figure type tag.

A character (a dog, A) represented by tag 2P is a character which appears in a specific application (for example, a game) which can be executed in information processing apparatus 3. A user can perform prescribed event processing for having a character appear in a specific application, by using this tag 2P. Namely, in execution of a program of the specific application, information processing apparatus 3 can have the character appear in a virtual space generated by the program of the application by using data stored in tag 2P.

Figure 18:
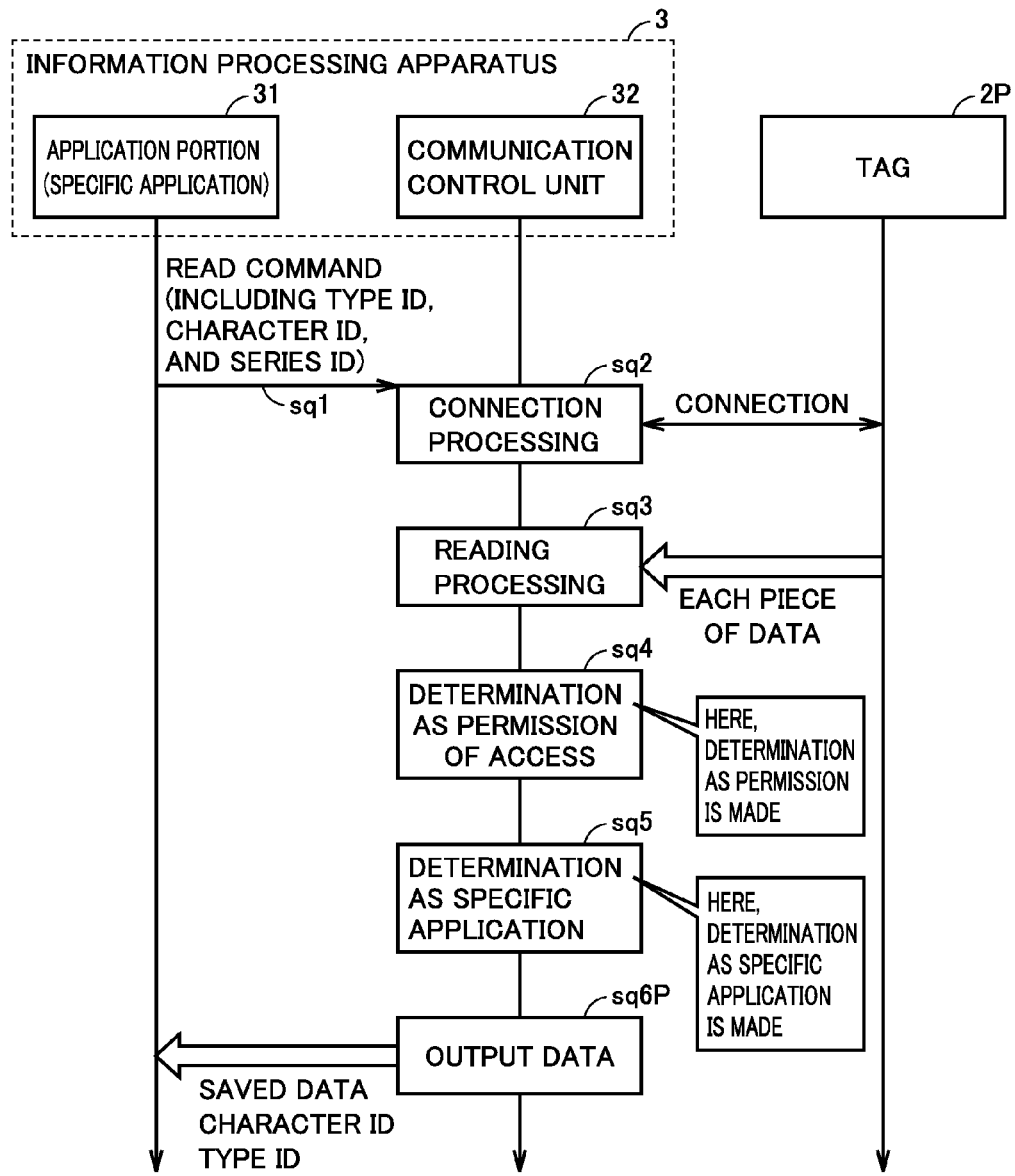
FIG. 18 is a diagram showing one example of a flow of processing in the information processing system in reading data from tag 2P based on the second embodiment.

FIG. 18 is a diagram showing one example of a flow of processing in the information processing system in reading data from tag 2P based on the second embodiment.

As shown in FIG. 18, a difference from the flow in the information processing system in FIG. 4 resides in replacement of processing sq6 with processing sq6P. Since the configuration is otherwise the same, detailed description thereof will not be repeated.

Figure 19:
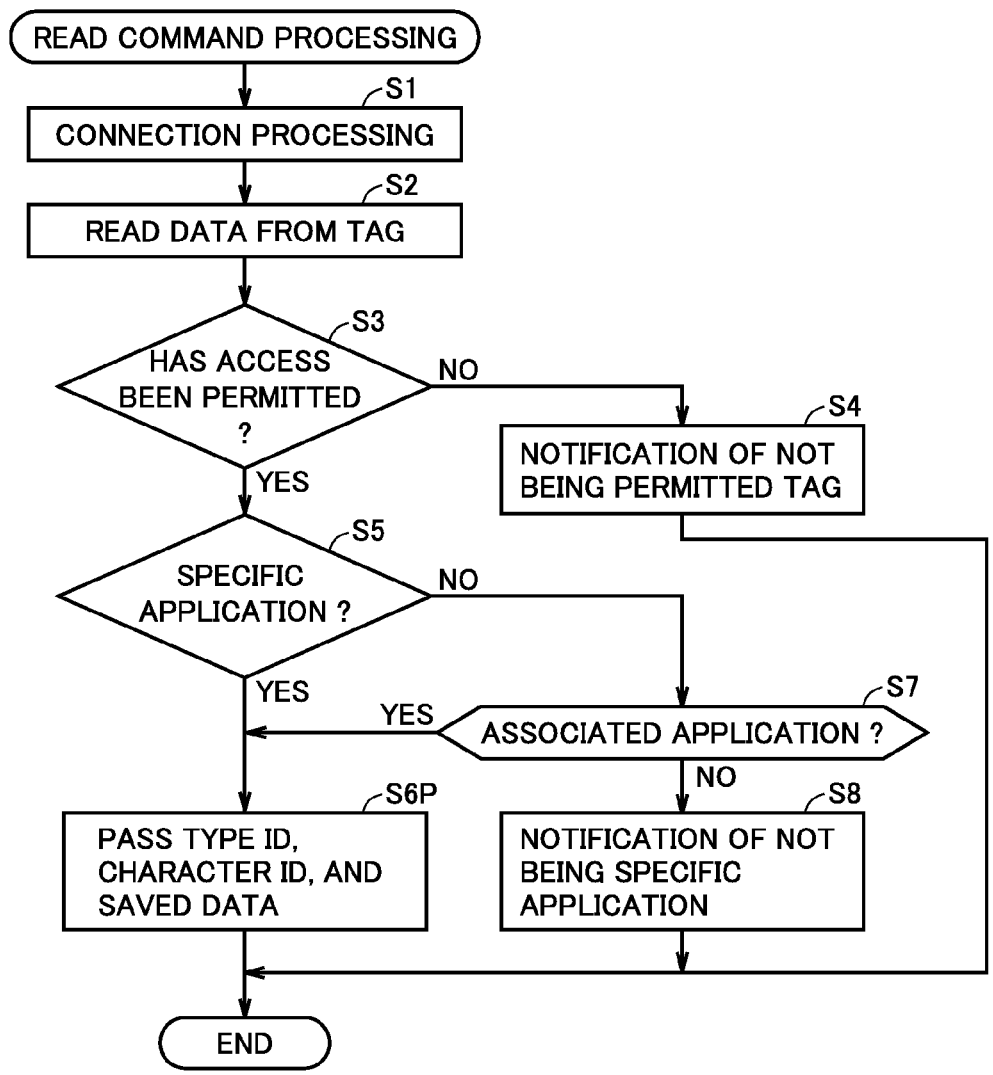
FIG. 19 is a flowchart showing one example of a flow of processing (read command processing) in communication control unit 32 when a read command is received based on the second embodiment.

FIG. 19 is a flowchart illustrating one example of a flow of processing (read command processing) in communication control unit 32 when a read command is received based on the second embodiment.

As shown in FIG. 19, a difference from the flowchart illustrating processing (read command processing) in communication control unit 32 when the read command is received in FIG. 5 resides in replacement of step S6 with step S6P. Since the configuration is otherwise the same, detailed description thereof will not be repeated.

Specifically, in step S6P, communication control unit 32 outputs a type ID, a character ID, and saved data to application portion 31. Namely, when an application program which has issued a command is a specific application program, communication control unit 32 permits reception of the type ID, the character ID, and the saved data.

Figure 20:
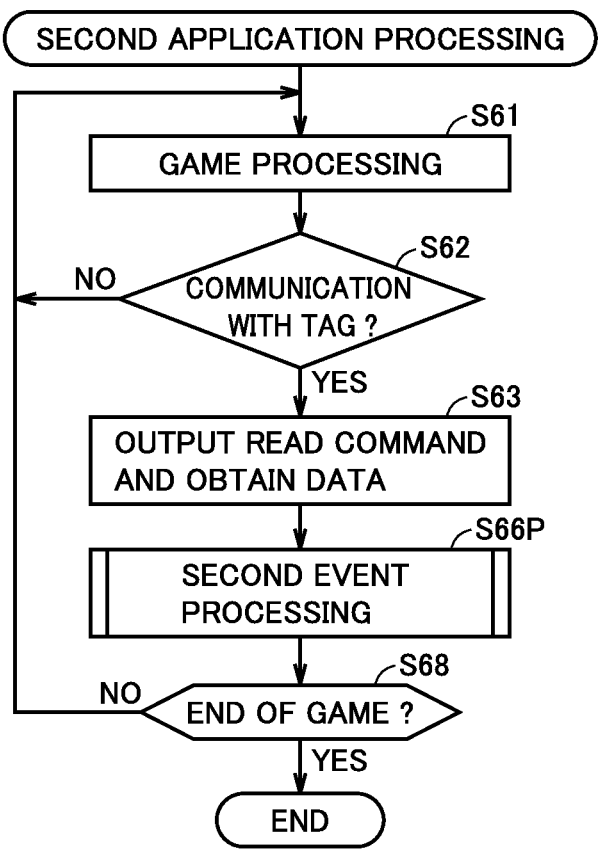
FIG. 20 is a flowchart illustrating second application processing based on the second embodiment.

FIG. 20 is a flowchart illustrating second application processing based on the second embodiment.

As shown in FIG. 20, a difference from the flowchart in FIG. 14 resides in replacement of step S66 with step S66P. Since the configuration is otherwise the same, detailed description thereof will not be repeated.

Figure 21:
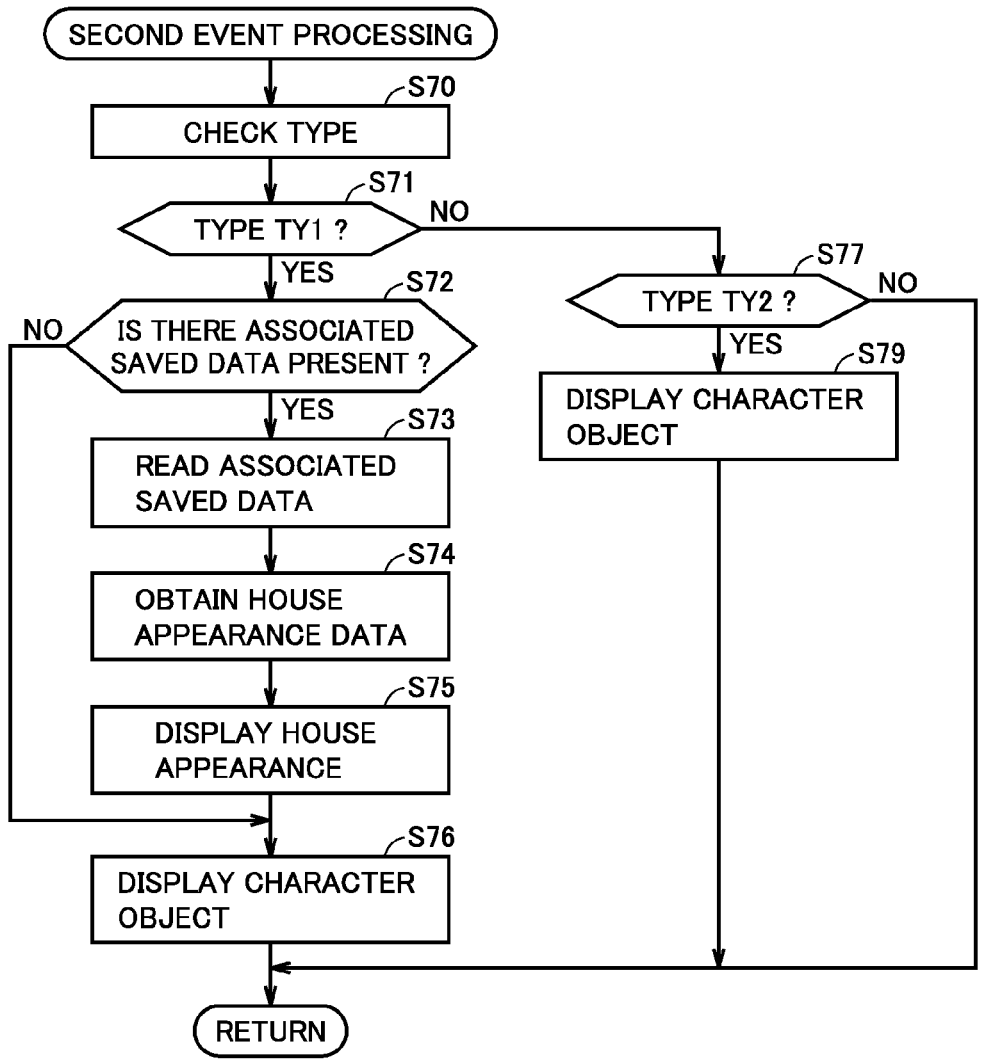
FIG. 21 is a flowchart illustrating second event processing based on the second embodiment.

FIG. 21 is a flowchart illustrating second event processing based on the second embodiment.

As shown in FIG. 21, initially, a type of a tag is checked (step S70). Specifically, application portion 31 checks a type ID sent from communication control unit 32.

Then, application portion 31 determines whether or not the obtained type ID indicates type TY1 (step S71).

When application portion 31 determines that the obtained type ID indicates type TY1 (YES in step S71), it determines in connection with the obtained saved data, whether or not there is saved data of an application program different from (associated with) the application program which is currently being executed (step S72). When only a character ID is obtained at this time point, it is determined that there is no associated saved data.

Information on an associated application ID is stored in advance in an application program. Application portion 31 determines whether or not there is saved data associated with an application ID matching with an application ID (associated application ID) associated with a specific application program which is being executed.

When it is determined in step S72 that there is associated saved data (YES in step S72), saved data corresponding to the associated application program is read (step S73).

Then, house appearance data included in the associated saved data is obtained (step S74).

Specifically, a house side surface ID, a roof ID, and a door ID representing partial data included in the associated saved data are obtained. A type of the obtained partial data is set in advance.

Then, an appearance of the house is displayed based on the obtained house appearance data (step S75). A specific application program which is being executed includes a generation program for displaying an appearance of the house based on the house side surface ID, the roof ID, and the door ID which are included in the associated saved data. Specifically, house model 100 in the virtual space is displayed as shown in FIG. 16.

Then, a character object corresponding to a character ID is displayed (step S76). As shown in FIG. 16, character object 110 is displayed in the virtual space. Character object 110 is a character which cannot be selected and cannot be operated by the user (for which an operation by the user is restricted).

Then, the process ends (return).

When it is determined in step S72 that there is no saved data associated with an application ID matching with an associated application ID of an associated application program (NO in step S72), it is determined that there is no associated saved data.

In this case, the process proceeds to step S76 and processing for displaying a character object represented by a character ID is performed (step S76).

Then, the process ends (return). An associated application ID of an associated application program is not limited to one type, and a plurality of types of application IDs may be used.

When it is determined that the obtained type ID does not indicate type TY1 (NO in step S71), whether or not the obtained type ID indicates type TY2 is determined (step S77).

When application portion 31 determines in step S77 that the obtained type ID indicates type TY2 (YES in step S77), a character object corresponding to the character ID is displayed (step S79). When the type ID indicates type TY2, application portion 31 performs processing affecting progress of the game as the second event processing. In the present example, a character which can be operated by the user appears.

Then, the process ends (return).

When application portion 31 determines in step S77 that the obtained type ID does not indicate type TY2 (NO in step S77), the process ends (return).

Figure 22:
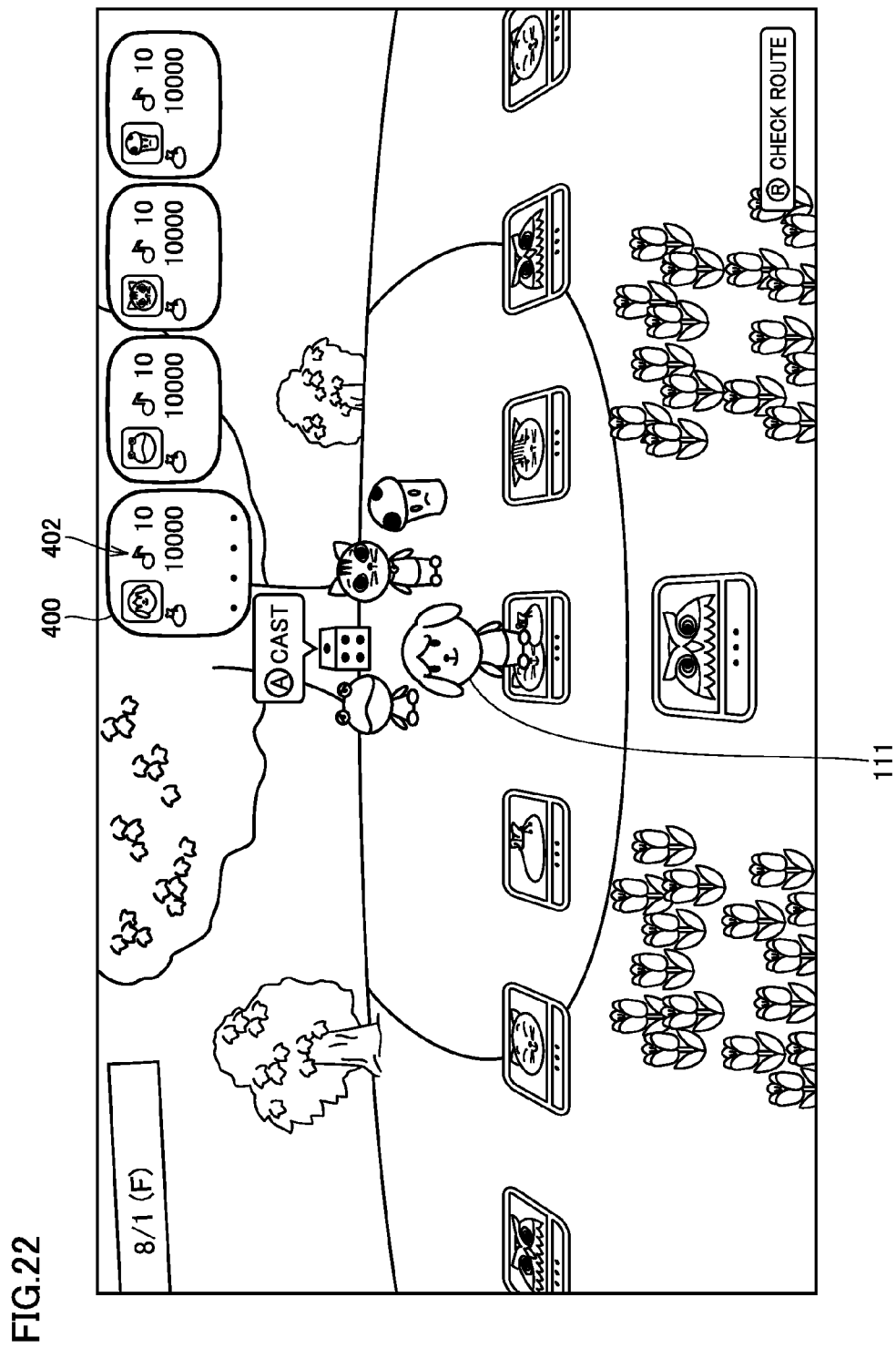
FIG. 22 is a diagram illustrating a case that a character object operated by a user is displayed by way of example based on the second embodiment.

FIG. 22 is a diagram illustrating a case that a character object operated by a user is displayed by way of example based on the second embodiment.

As shown in FIG. 22, in the present example, a game screen when an application program executing a sugoroku game is executed is displayed. In the game screen, a plurality of grids used for progress of the sugoroku game are arranged. The sugoroku game proceeds as a character operated by the user advances through grids in accordance with a pip (number) of sugoroku which appears in response to an operation by the user. In the present example, a case that a character object 111 operated by the user is displayed on the game screen is shown.

A plurality of character objects which can be operated by the user are displayed on the game screen in the present example. Four character objects are displayed on the game screen by way of example.

A point corresponding to a character object is displayed on the game screen.

By way of example, a point display area 400 provided in correspondence with character object 111 is displayed, which is also the case with other character objects. In point display area 400, "10" points is shown as a point value 402, which is also the case with other character objects. A point value is increased or decreased in correspondence with a character object as the sugoroku game is executed.

Information processing apparatus 3 based on the present second embodiment performs processing in accordance with a type of a tag in execution of the second application program (application B). Specifically, for the tag of type TY1, processing is performed by using data stored in tag 2 processed with application A. Information processing apparatus 3 performs processing not affecting progress of the game. For example, house model 100 and character object 110 represented by a character ID are displayed as objects (operation-unacceptable objects) in the game screen.

On the other hand, for a tag of type TY2, data stored in tag 2 processed with application A is not used. Processing based on a character ID stored in tag 2 is performed. Information processing apparatus 3 performs processing affecting progress of the game. For example, character object 111 which can be selected as a character to be operated in the game screen is displayed. The game in which character object 111 is operated can be executed.

Through the processing, event processing different depending on a type of a storage medium (tag) can be performed when the application program is the same.

Namely, by performing different processing, processing with zest of a tag being enhanced can be performed by using data stored in the tag.

(Third Embodiment)

Yet another case that processing is different depending on a tag different in type for the same application program will be described in a third embodiment. Specifically, a case that processing is different in second application processing depending on a type of a tag will be described.

Figure 23:
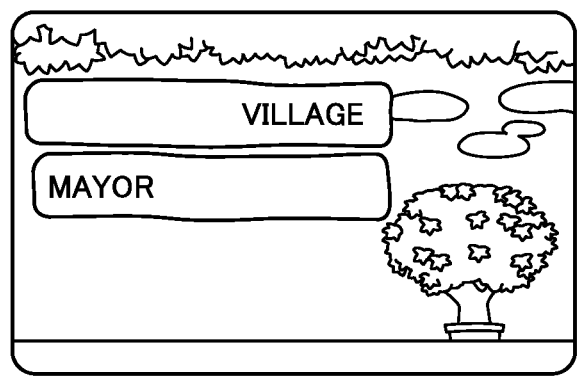
FIG. 23 is a diagram showing one example of an appearance of a tag 2Q based on a third embodiment.

FIG. 23 is a diagram showing one example of an appearance of a tag 2Q based on a third embodiment.

As shown in FIG. 23, tag 2Q in the present embodiment is a card type tag.

A type TY3 is associated as the card type tag by way of example of a type different from the card type tag in FIG. 2.

Tag 2Q is a horizontal card as compared with the vertical card of tag 2, and different therefrom in geometrical form. A form is different also in design that it does not have such an appearance that a picture of a character is depicted, but has such an appearance that a tree is depicted. A geometrical form may be differed also based on a size of a card. A form may be differed based on a material for a card. For example, depending on a type of a tag, a form can be differed also based on such a material as paper, plastic, or a resin.

Tag 2Q is made use of only in a specific application (for example, a game) which can be executed in information processing apparatus 3. In the present example, it is used only in application B. A user uses this tag 2Q so that prescribed event processing for having a map used in a game in a specific application (by way of example, a sugoroku map) appear can be performed. Namely, in execution of a program of the specific application, information processing apparatus 3 has a map appear in the virtual space generated by the program of the application by using data stored in tag 2Q. A game making use of the map can be executed.

Figure 24:
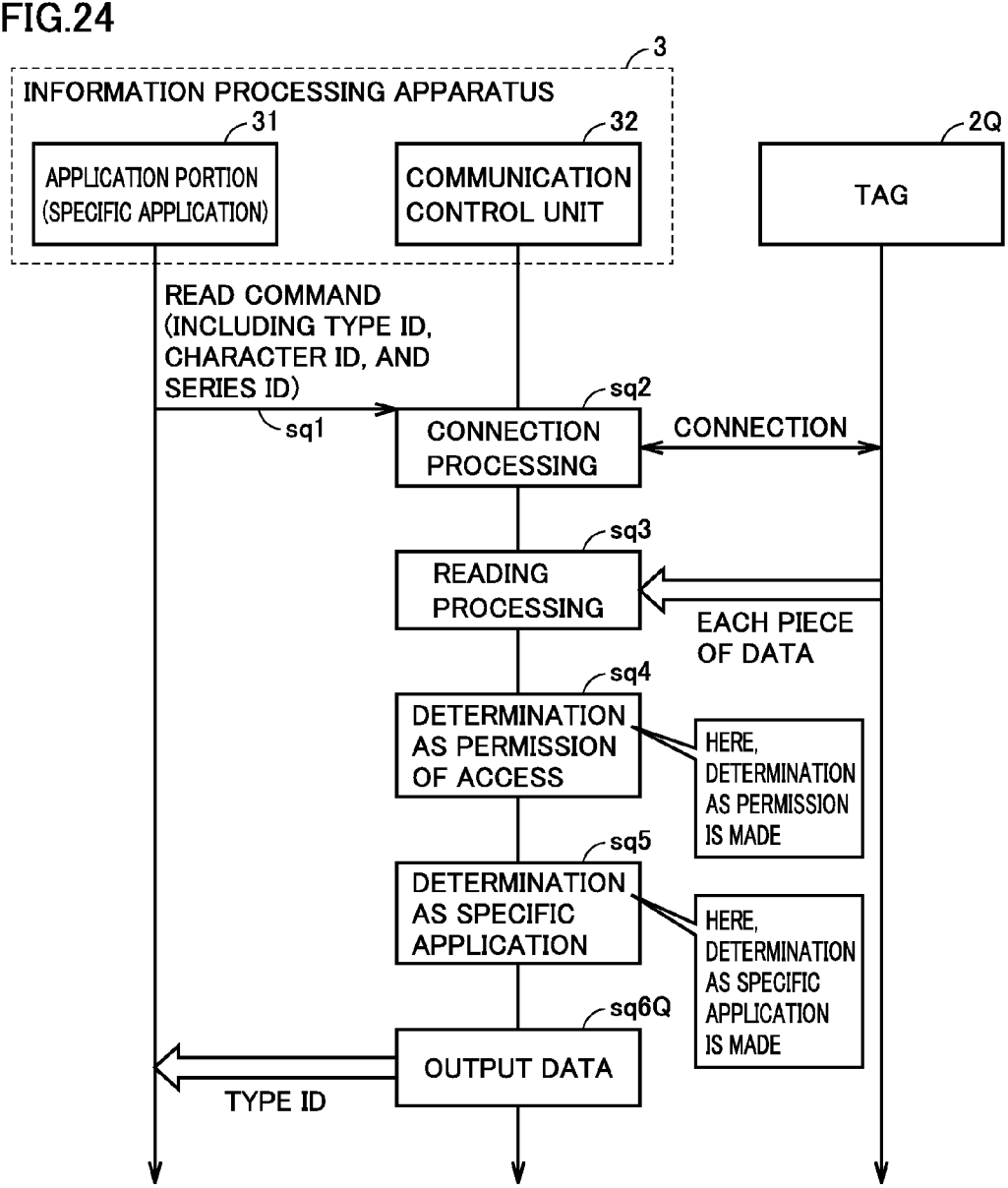
FIG. 24 is a diagram showing one example of a flow of processing in the information processing system in reading data from tag 2Q based on the third embodiment.

FIG. 24 is a diagram showing one example of a flow of processing in the information processing system in reading data from tag 2Q based on the third embodiment.

As shown in FIG. 24, a difference from the flow in the information processing system in FIG. 4 resides in replacement of processing sq6 with processing sq6Q. Since the configuration is otherwise the same, detailed description thereof will not be repeated.

Figure 25:
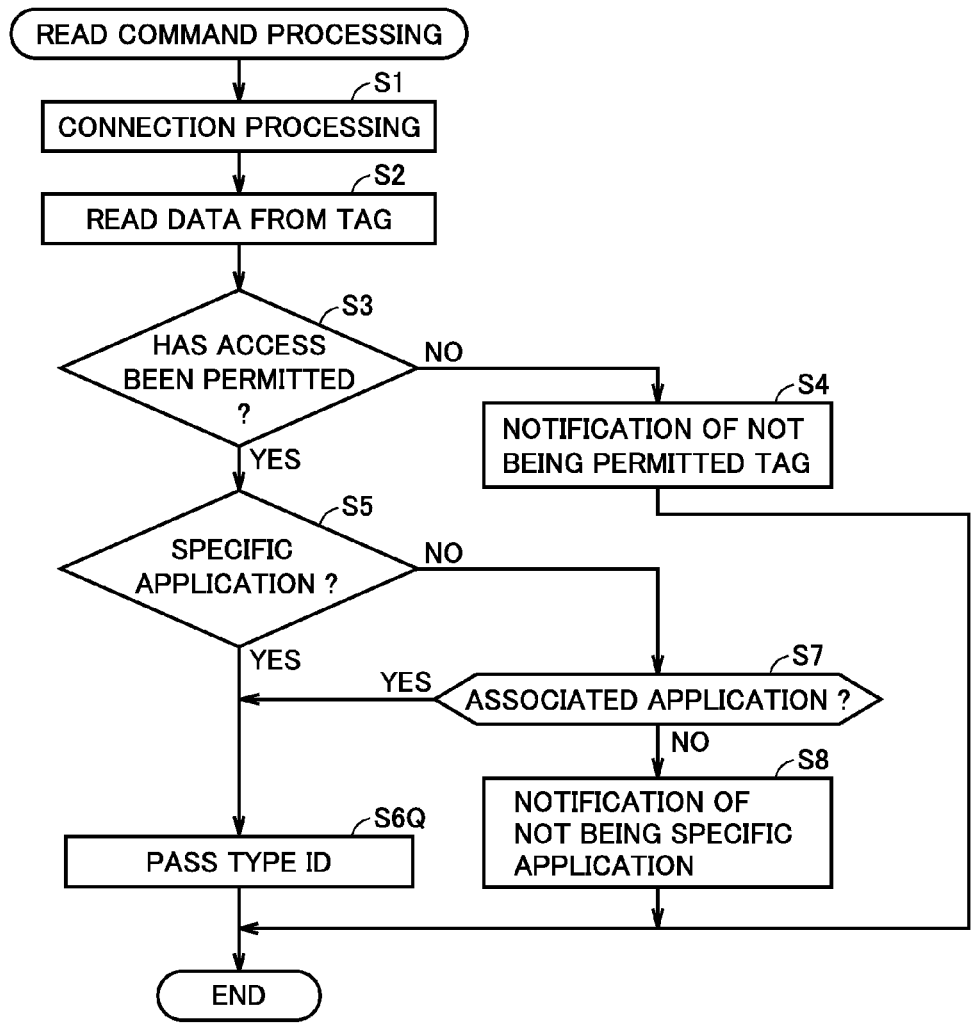
FIG. 25 is a flowchart showing one example of processing (read command processing) in communication control unit 32 when a read command is received based on the third embodiment.

FIG. 25 is a flowchart showing one example of a flow of processing (read command processing) in communication control unit 32 when a read command is received based on the third embodiment.

As shown in FIG. 25, a difference from the flowchart illustrating processing (read command processing) in communication control unit 32 when the read command is received in FIG. 5 resides in replacement of step S6 with step S6Q. Since the configuration is otherwise the same, detailed description thereof will not be repeated.

Specifically, in step S6Q, communication control unit 32 outputs a type ID to application portion 31. Namely, when an application program which has issued a command is a specific application program, communication control unit 32 permits reception of the type ID.

Figure 26:
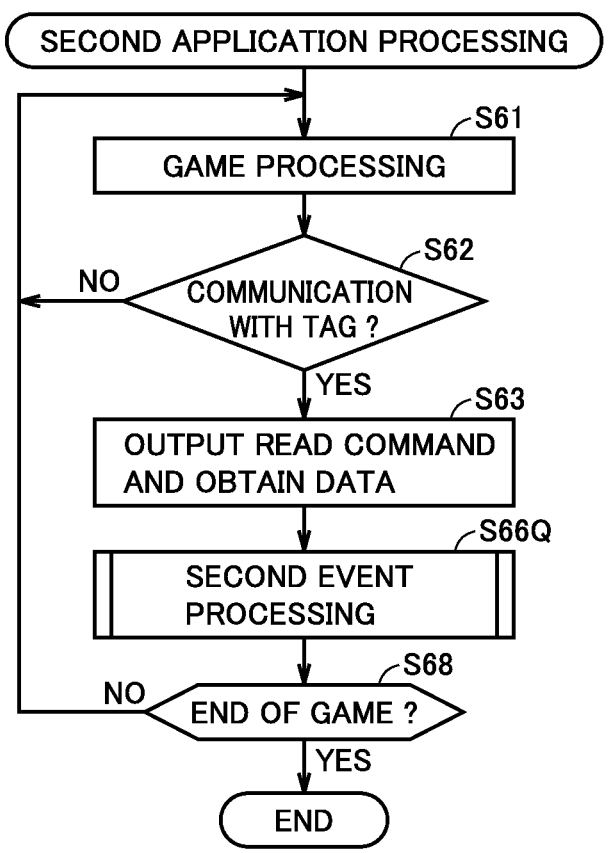
FIG. 26 is a flowchart illustrating second application processing based on the third embodiment.

FIG. 26 is a flowchart illustrating second application processing based on the third embodiment.

As shown in FIG. 26, a difference from the flowchart in FIG. 14 resides in replacement of step S66 with step S66Q. Since the configuration is otherwise the same, detailed description thereof will not be repeated.

Figure 27:
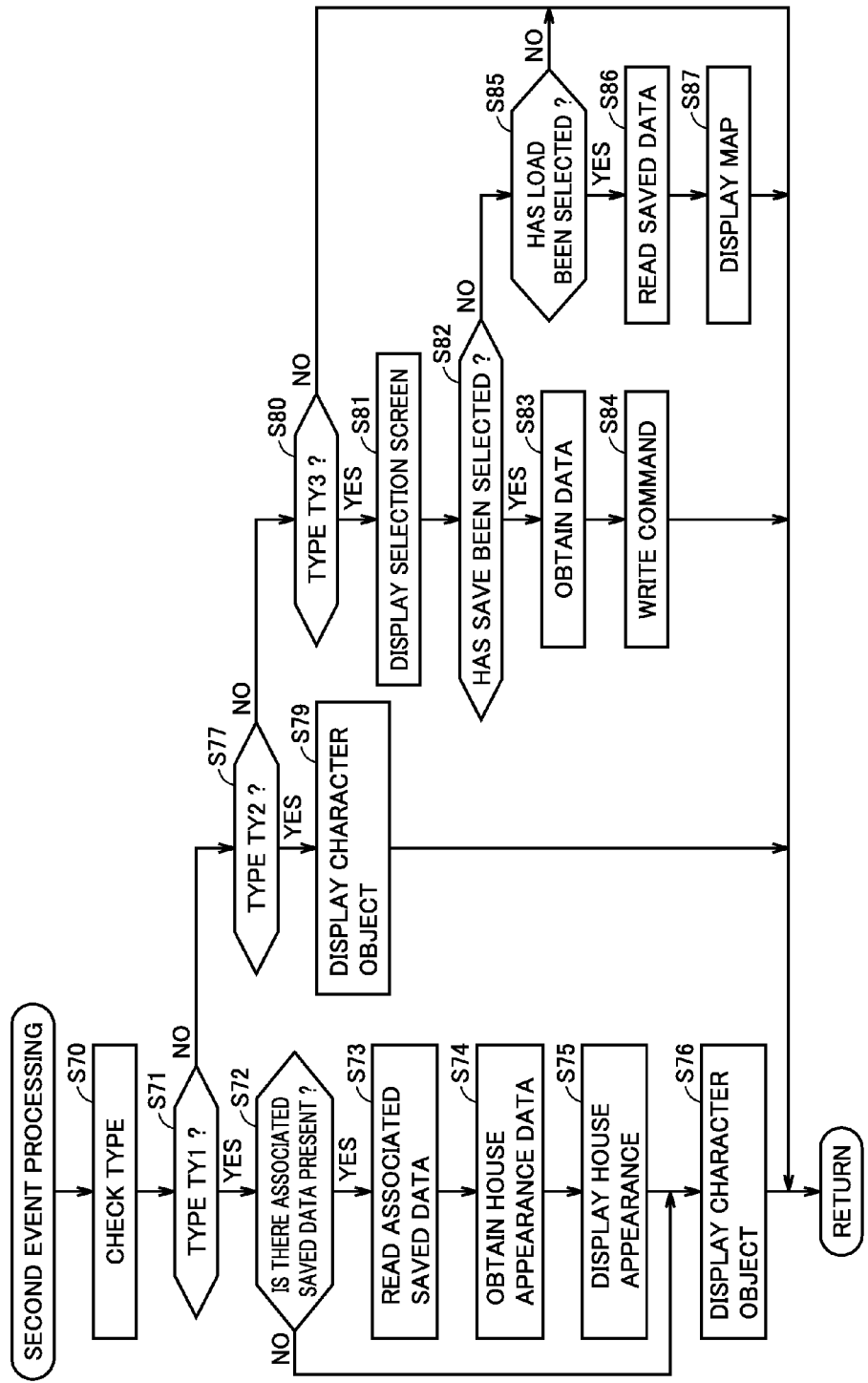
FIG. 27 is a flowchart illustrating second event processing based on the third embodiment.

FIG. 27 is a flowchart illustrating second event processing based on the third embodiment.

As shown in FIG. 27, initially, a type of a tag is checked (step S70).

Specifically, application portion 31 checks a type ID sent from communication control unit 32.

Then, application portion 31 determines whether or not the obtained type ID indicates type TY1 (step S71).

When application portion 31 determines that the obtained type ID indicates type TY1 (YES in step S71), it determines in connection with the obtained saved data, whether or not there is saved data of an application program different from (associated with) an application program which is currently being executed (step S72). When only a character ID is obtained at this time point, it is determined that there is no associated saved data.

Information on an associated application ID is stored in advance in an application program. Application portion 31 determines whether or not there is saved data associated with an application ID matching with an application ID (associated application ID) associated with a specific application program which is being executed.

When it is determined in step S72 that there is associated saved data (YES in step S72), saved data corresponding to the associated application program is read (step S73).

Then, house appearance data included in the associated saved data is obtained (step S74).

Specifically, a house side surface ID, a roof ID, and a door ID representing partial data included in the associated saved data are obtained. A type of the obtained partial data is set in advance.

Then, an appearance of the house is displayed based on the obtained house appearance data (step S75). A specific application program which is being executed includes a generation program for displaying an appearance of the house based on the house side surface ID, the roof ID, and the door ID which are included in the associated saved data. Specifically, house model 100 in the virtual space is displayed as shown in FIG. 16.

Then, a character object corresponding to a character ID is displayed (step S76). As shown in FIG. 16, character object 110 is displayed in the virtual space. Character object 110 is a character which cannot be selected and cannot be operated by the user (for which an operation by the user is restricted).

Then, the process ends (return).

When it is determined in step S72 that there is no saved data associated with an application ID matching with the associated application ID of the associated application program (NO in step S72), it is determined that there is no associated saved data.

In this case, the process proceeds to step S76 and processing for displaying a character object represented by a character ID is performed (step S76).

Then, the process ends (return). An associated application ID of an associated application program is not limited to one type, and a plurality of types of application IDs may be used.

When it is determined that the obtained type ID does not indicate type TY1 (NO in step S71), whether or not the obtained type ID indicates type TY2 is determined (step S77).

When application portion 31 determines in step S77 that the obtained type ID indicates type TY2 (YES in step S77), a character object corresponding to the character ID is displayed (step S79). When the type ID indicates type TY2, application portion 31 performs processing affecting progress of the game as the second event processing. In the present example, a character which can be operated by the user appears.

Then, the process ends (return).

When application portion 31 determines in step S77 that the obtained type ID does not indicate type TY2 (NO in step S77), it determines whether or not the obtained type ID indicates type TY3 (step S80).

When application portion 31 determines in step S80 that the obtained type ID indicates type TY3 (YES in step S80), a selection screen is displayed (step S81). When the type ID indicates type TY3, application portion 31 has a sugoroku map appear, which is based on map data stored in tag 2Q, in response to selection by the user, as the second event processing in the present example. Alternatively, map data for a sugoroku map can be stored in tag 2Q in response to selection by the user.

When application portion 31 determines in step S80 that the obtained type ID does not indicate type TY3 (NO in step S80), the process ends (return). Since the tag cannot be used, the second event processing ends.

Figure 28:
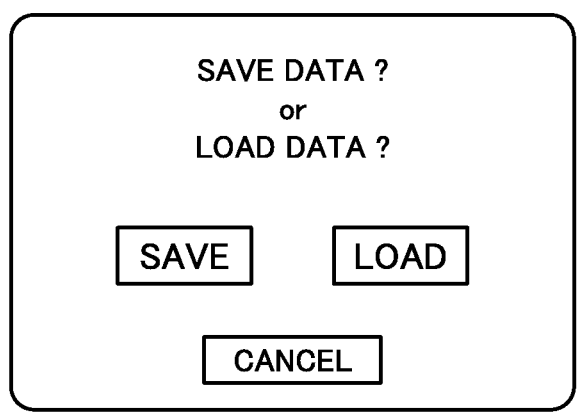
FIG. 28 is a diagram illustrating a selection screen based on the third embodiment.

FIG. 28 is a diagram illustrating the selection screen based on the third embodiment.

As shown in FIG. 28, here, "save data?" and "load data?" are displayed, and a "save" button, a "load" button, and a "cancel" button which can be selected by the user are provided.

Referring again to FIG. 27, then, application portion 31 determines whether or not save has been selected in the selection screen (step S82).

When application portion 31 determines in step S82 that save has been selected (YES in step S82), data is obtained (step S83).

Specifically, the map data made use of in the game processing is obtained. The map data includes data on grids of sugoroku and data on an object (an operation-unacceptable object). In a case that house model 100 described with reference to FIG. 16 is displayed, the data on the object (operation-unacceptable object) includes house appearance data. In a case that character object 110 described with reference to FIG. 16 is displayed, the data on the object includes a character ID.

Then, in step S84, application portion 31 outputs a write command for the obtained data to communication control unit 32.

In response thereto, communication control unit 32 communicates with tag 2Q (step S10 in FIG. 7), and outputs data (map data) to be written from application portion 31 to communication control unit 32. Then, data is written into tag 2Q from communication control unit 32.

Then, the process ends (return).

With the write command, map data can be saved in tag 2Q. Then, by loading data by making use of tag 2Q, a map based on the saved map data can be displayed.

Figure 29:
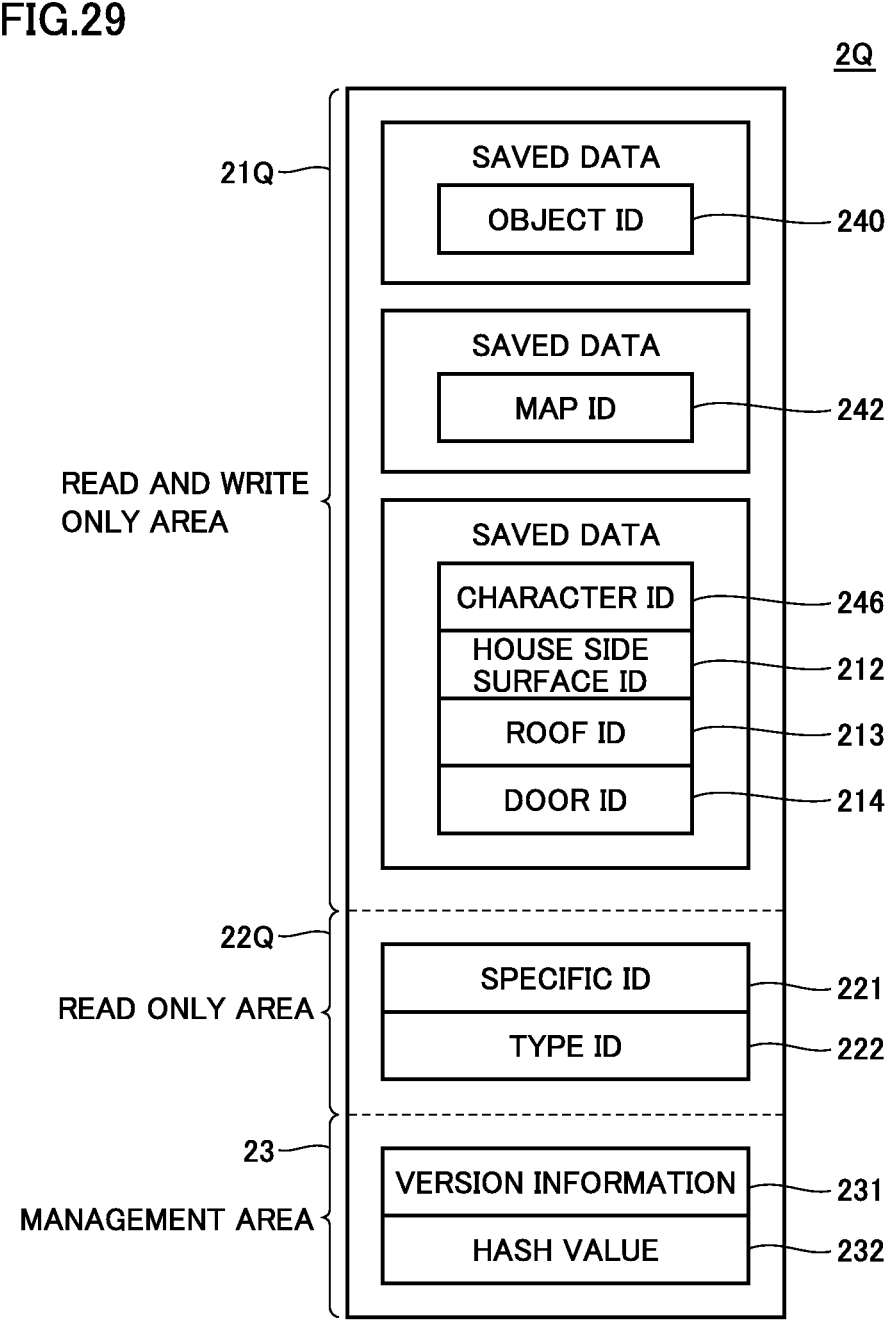
FIG. 29 is a diagram illustrating one example of data stored in tag 2Q.

FIG. 29 is a diagram illustrating one example of data stored in tag 2Q.

As shown in FIG. 29, tag 2Q includes a readable and writable area 21Q, a read only area 22Q, and management area 23. Specifically, a difference from the data stored in tag 2 in FIG. 3 resides in readable and writable area 21Q and read only area 22Q.

At least data (information) as follows is stored in read only area 22Q.

(Data 221 representing) a specific ID
(Data 222 representing) a type ID

As described above, tag 2Q is used only in application B and has a sugoroku map appear in the virtual space. Therefore, in the present example, (data 223 representing) a character ID or (data 224 representing) a series ID is not stored.

Contents in the map data (a plurality of pieces of saved data) are specifically shown in readable and writable area 21Q.

Specifically, an object ID (data 240) defining an object arranged in a sugoroku map, a map ID (data 242) relating to a topology in the sugoroku map, a character ID (data 246), house appearance data (a house side surface ID (data 212), a roof ID (data 213), and a door ID (data 214) are stored.

Referring again to FIG. 27, when application portion 31 determines in step S82 that save has not been selected (NO in step S82), it determines whether or not load has been selected (step S85).

When application portion 31 determines in step S85 that load has been selected (YES in step S85), saved data is read (step S86). Specifically, map data written in tag 2Q as saved data is obtained. The map data includes data on a topology of the map of grids of sugoroku (a map ID) and data on an object (an operation-unacceptable object) (a character ID).

Then, application portion 31 has the map based on the obtained map data displayed (step S87).

When application portion 31 determines in step S85 that load has not been selected (NO in step S85), the process ends (return). Specifically, it is determined that the "cancel" button has been selected and event processing relating to tag 2Q ends.

Information processing apparatus 3 based on the present third embodiment performs processing in accordance with a type of a tag in execution of the second application program (application B). Specifically, for the tag of type TY1, processing is performed by using data stored in tag 2 processed with application A. Information processing apparatus 3 performs processing not affecting progress of the game. For example, house model 100 and character object 110 represented by a character ID are displayed as objects (operation unacceptable objects) in the game screen.

For tag 2P of type TY2, data stored in tag 2P processed with application A is not used. Processing based on a character ID stored in tag 2P is performed. Information processing apparatus 3 performs processing affecting progress of the game. For example, character object 111 which can be selected as a character to be operated in the game screen is displayed. The game in which character object 111 is operated can be executed.

For tag 2Q of type TY3, processing based on the map data stored in tag 2Q is performed. For example, a map in the game screen is displayed. Alternatively, processing for saving (storing) map data in tag 2Q is performed.

Through the processing, event processing different depending on a type of a storage medium (tag) can be performed even when the application program is the same.

Namely, by performing different processing, processing with zest of a tag being enhanced can be performed by using data stored in a tag.

Tag 2Q of type TY3 stores map data including data on an object (an operation-unacceptable object). Therefore, when the object is modified (updated) in the game screen, map data based on the updated object can be stored.

For example, each time tag 2 of type TY1 is used in application B, for example, a house model and a character object represented by the character ID are displayed as objects (operation-unacceptable objects) in the game screen. Then, map data including the object (operation-unacceptable object) is stored in tag 2Q of type TY3 and tag 2Q is used in next game processing, so that the game can be executed with the map including map data including the updated object (operation-unacceptable object).

Through the processing, processing with zest of the tag being enhanced can be performed by using the data stored in the tag.

FIG. 30 is a diagram illustrating one example of another form of use of tag 2Q based on the third embodiment.

As shown in FIG. 30, in the present example, in an information processing apparatus 3a, (1) data in tag 2Q is read in accordance with application program B (application B). Specifically, map data for a sugoroku game stored in tag 2Q is read. Then, the game can be executed with representation of a map based on the map data.

Then, in information processing apparatus 3a, (2) data is written in tag 2Q in accordance with application program B (application B). Specifically, the map data for the sugoroku game (data on an object or house appearance data) is written in tag 2Q.

Then, in the present example, in an information processing apparatus 3b different from information processing apparatus 3a, (3) data in tag 2Q is read in accordance with application program B (application B). Then, the game can be executed with representation of the map based on the map data.

In the present third embodiment, data written in tag 2Q in accordance with application B in information processing apparatus 3a can be used in application B in another information processing apparatus 3b. Specifically, the data on the object or the house appearance data are environmental data relating to representation of an appearance of a house model arranged in a map virtual space. The environmental data can be used in another device by making use of tag 2Q.

(Fourth Embodiment)

A case that processing is different in second application processing as a tag and an information processing apparatus are associated with each other will be described in a fourth embodiment.

FIG. 31 is a flowchart illustrating second application processing based on the fourth embodiment.

As shown in FIG. 31, a difference from the flowchart in FIG. 14 resides in replacement of step S66 with step S66R. Since the configuration is otherwise the same, detailed description thereof will not be repeated.

Figure 32:
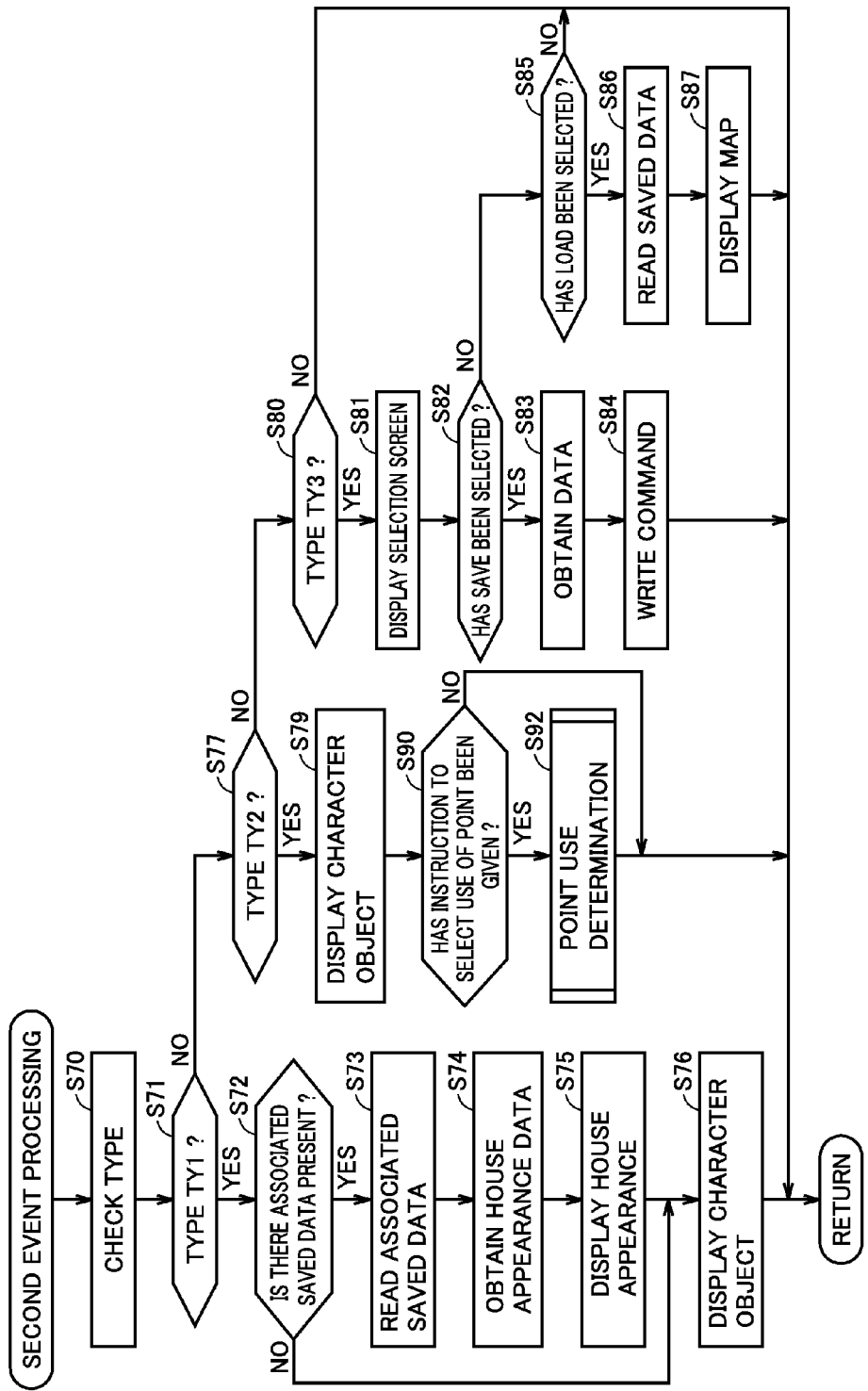
FIG. 32 is a flowchart illustrating second event processing based on the fourth embodiment.

FIG. 32 is a flowchart illustrating second event processing based on the fourth embodiment.

As shown in FIG. 32, a difference from the second event processing shown in FIG. 27 resides in addition of steps S90 and S92. Since the flow is otherwise the same, detailed description thereof will not be repeated.

When application portion 31 determines in step S77 that an obtained type ID indicates type TY2 (YES in step S77), a character object corresponding to a character ID is displayed (step S79). When the type ID indicates type TY2, application portion 31 performs processing affecting progress of the game as the second event processing. In the present example, a character which can be operated by a user appears.

Then, application portion 31 determines whether or not an instruction to select use of points has been given (step S90). Specifically, whether or not an instruction to select use of points has been given in response to an operation instruction from a user is determined. For example, application portion 31 determines whether or not an instruction to select use of points has been given, based on whether or not a prescribed operation instruction (for example, an operation of a prescribed button) has been given through input portion 16 of information processing apparatus 3.

When application portion 31 determines in step S90 that an instruction to select use of points has been given (YES in step S90), it performs processing for determining use of points (point use determination processing) (step S92). In the point use determination processing, whether or not a character object corresponding to a character ID can be subjected to processing using a point value brought in correspondence with the character object is determined, and prescribed processing is performed based on a result of determination.

When application portion 31 determines in step S90 that an instruction to select use of points has not been given (NO in step S90), the point use determination processing in step S92 is skipped and the process ends (return).

Figure 33:
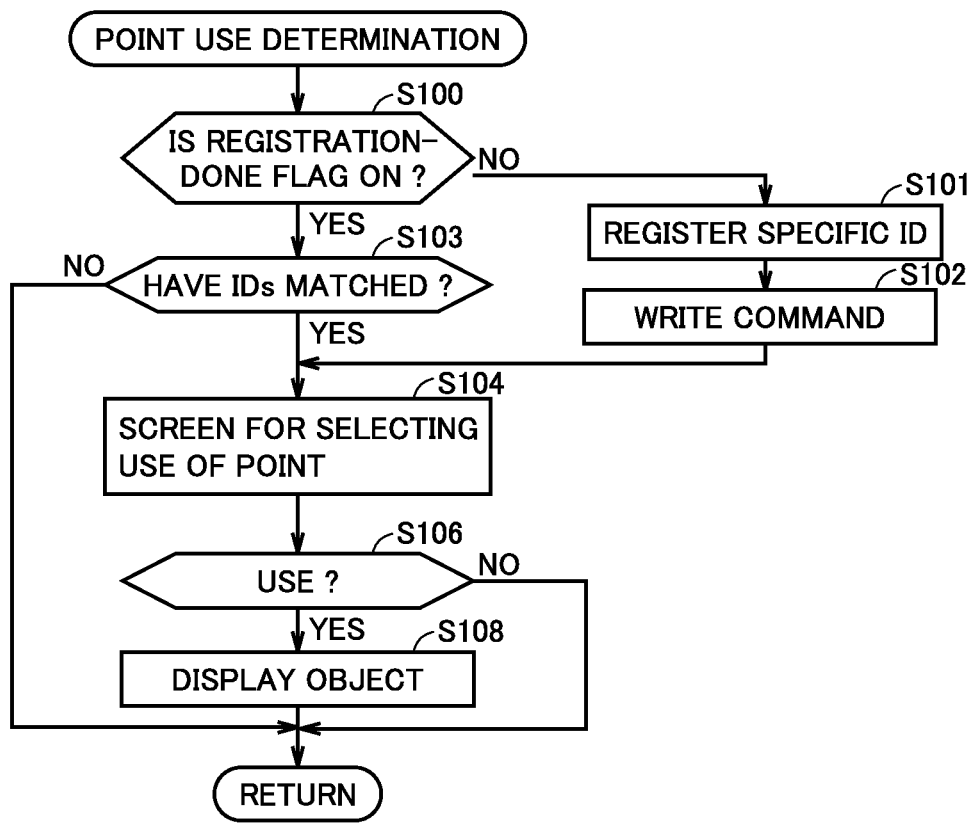
FIG. 33 is a flowchart illustrating a sub routine of point use determination processing based on the fourth embodiment.

FIG. 33 is a flowchart illustrating a sub routine of point use determination processing based on the fourth embodiment.

As shown in FIG. 33, application portion 31 determines whether or not a registration-done flag has been turned on (step S100). Specifically, application portion 31 determines whether or not a registration-done flag has been registered as being turned on in saved data corresponding to an application ID (application B in the present example) of tag 2P of type TY2.

When application portion 31 determines in step S100 that the registration-done flag has not been turned on (that is, turned off) (NO in step S100), a specific ID included in the data obtained from tag 2P is saved in memory 14 (step S101).

The specific ID of tag 2P refers to information (identification information) identifying tag 2P included in data read from tag 2P.

Then, application portion 31 outputs a write command to turn on the registration-done flag to communication control unit 32 (step S102). Specifically, application portion 31 sets the registration-done flag to on as saved data corresponding to an application ID (in the present example, application B) of tag 2P of type TY2, by saving (registering) the specific ID of tag 2P in memory 14 of information processing apparatus 3.

Application portion 31 performs prescribed event processing based on data in registered tag 2P by registering the specific ID of tag 2P in memory 14.

Processing in step S101 and processing in step S102 can be interchanged.

Figure 34:
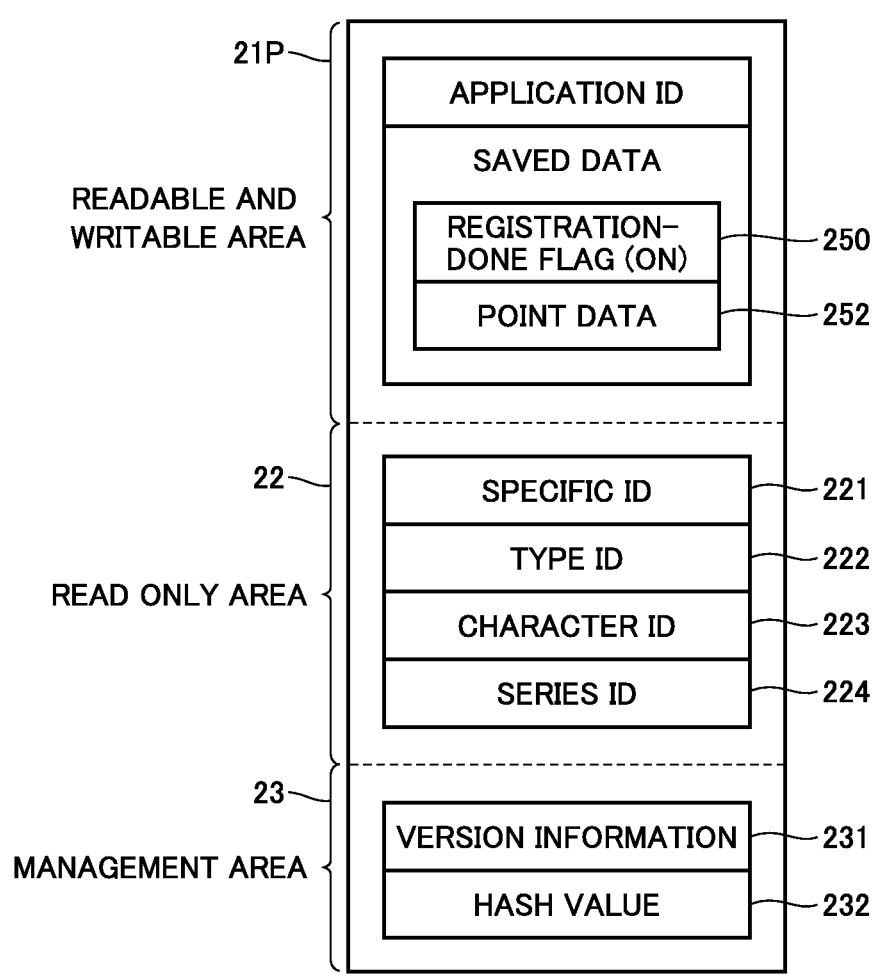
FIG. 34 is a diagram illustrating one example of data stored in tag 2P.

FIG. 34 is a diagram illustrating one example of data stored in tag 2P.

As shown in FIG. 34, tag 2P has a readable and writable area 21P, read only area 22, and management area 23. Specifically, contents in saved data are specifically shown as compared with the data stored in tag 2 in FIG. 3.

Saved data corresponding to an application ID is stored in readable and writable area 21P.

In the present example, saved data corresponding to application B is shown by way of example.

A registration-done flag (data 250) and point data (data 252) are stored as saved data.

The registration-done flag refers to data indicating that a specific ID of tag 2P has been registered in information processing apparatus 3. The registration-done flag being turned on indicates that the specific ID has been registered. The registration-done flag being turned off indicates that the specific ID has not been registered.

Point data indicates a point value increased or decreased as a result of execution of the sugoroku game of application B.

Referring again to FIG. 33, when application portion 31 determines in step S100 that the registration-done flag is on (YES in step S100), it determines whether or not IDs match with each other (step S103). Specifically, when application portion 31 determines that the registration-done flag has been turned on, it determines whether or not the specific ID included in the data read from tag 2P and the specific ID of the tag already registered in memory 14 match with each other.

When application portion 31 determines in step S103 that IDs match with each other (YES in step S103), a point use selection screen is displayed (step S104). Specifically, application portion 31 has the point use selection screen displayed when it determines that the specific ID included in the data read from tag 2P and the specific ID of the tag already registered in memory 14 match with each other.

Figure 35:
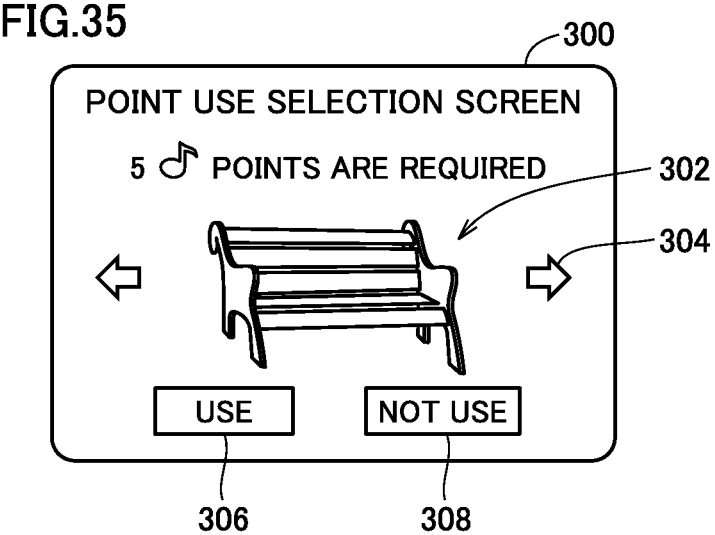
FIG. 35 is a diagram illustrating a point use selection screen based on the fourth embodiment.

FIG. 35 is a diagram illustrating the point use selection screen based on the fourth embodiment.

As shown in FIG. 35, a point use selection screen 300 in which points can selectively be used is shown.

Specifically, a screen in which an object to be displayed on a map can be selected by using a point value brought in correspondence with a character object is shown.

By way of example, a "bench" object 302 is shown, and in order to display "bench" object 302 on the map, 5 points are required as a point value.

In point use selection screen 300, a "use" button 306 and a "not use" button 308 are provided. A cursor 304 is provided.

An object to be displayed on a map can be changed by selecting cursor 304. For example, instead of the "bench" object, change to a "seat swing" object can also be made by selecting cursor 304.

The user can select a displayed object by operating input portion 16 so as to select "use" button 306.

The user can select use of no points in point use selection screen 300 by operating input portion 16 so as to select "not use" button 308. Then, representation of point use selection screen 300 ends.

For example, when the user selects "use" button 306, "bench" object 302 can be displayed on the map.

Figure 36:
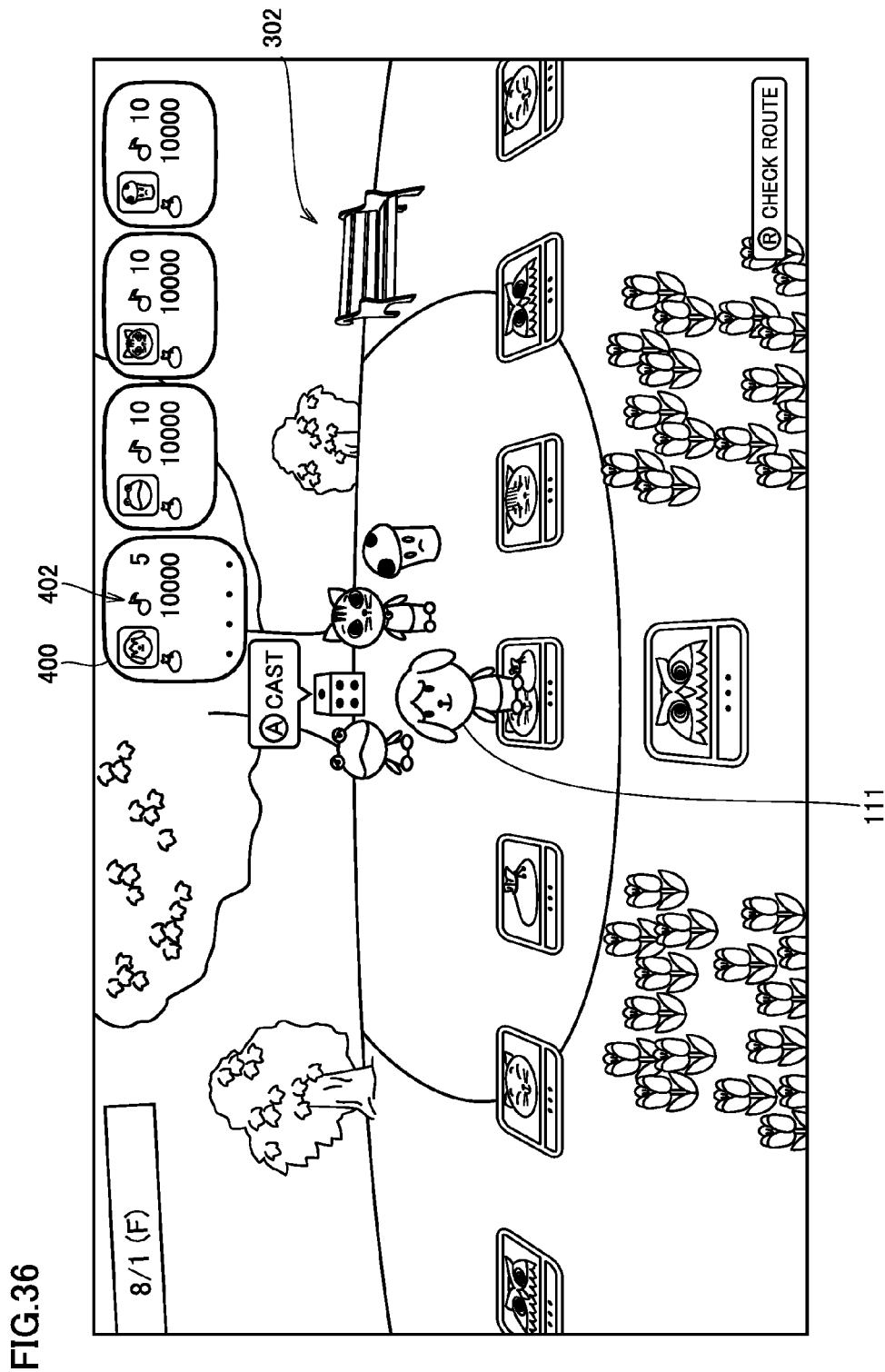
FIG. 36 is a diagram illustrating a case that a bench object is displayed by way of example based on the fourth embodiment.

FIG. 36 is a diagram illustrating a case that a bench object is displayed by way of example based on the fourth embodiment.

As shown in FIG. 36, as compared with the screen in FIG. 22, "bench" object 302 is displayed on the game screen.

"Bench" object 302 is an object not affecting progress of the game (an operation-unacceptable object), similarly to house model 100 described above.

Through the processing, in point display area 400 provided in correspondence with character object 111, point value 402 has been changed from "10" points to "5" points.

Referring again to FIG. 33, application portion 31 determines whether or not to use (step S106). Specifically, application portion 31 determines whether or not the "use" button has been selected in point use selection screen 300.

When application portion 31 determines in step S106 to use (YES in step S106), an object is displayed (step S108). Specifically, when the "use" button has been selected in point use selection screen 300, application portion 31 has the selected object displayed on the map.

Then, the process ends (return).

When application portion 31 determines in step S106 not to use (NO in step S106), the process ends (return). Specifically, when the "not use" button has been selected in point use selection screen 300, application portion 31 quits representation of the point use selection screen.

When application portion 31 determines in step S103 that IDs do not match (NO in step S103), the process ends (return). Specifically, application portion 31 determines whether or not the specific ID included in the data in tag 2P and the specific ID of the tag already registered in memory 14 match with each other, and when it determines that they do not match with each other, representation of the point use selection screen is skipped and the process ends. Therefore, points cannot be used in this case.

Through the processing, when the specific ID of the tag registered in memory 14 of information processing apparatus 3 and the specific ID included in the data read from tag 2P match with each other, an object can be arranged by using points in saved data. When a specific ID different from the specific ID of tag 2P has been registered in memory 14 of information processing apparatus 3, points in saved data cannot be used.

For example, when a user has tag 2P, game processing can be performed, with a character object corresponding to a character ID stored in tag 2P appearing. When game processing based on tag 2P is executed, a specific ID of tag 2P is registered in memory 14 of information processing apparatus 3. A registration-done flag of tag 2P is set to on. In this case, in game processing, processing making use of a point value stored in tag 2P with a character corresponding to a character ID stored in tag 2P appearing can be performed.

When another user has another tag 2P (different in specific ID), in game processing, game processing with a character object corresponding to a character ID stored in another tag 2P appearing can be performed. A specific ID of another tag 2P has been registered in memory 14 of another information processing apparatus 3. A registration-done flag of another tag 2P has been set to on. In this case, in game processing, though a character object corresponding to a character ID stored in another tag 2P appears, processing making use of a point value stored in another tag 2P cannot be performed. Namely, in this case, processing is restricted.

Therefore, by registering a specific ID of tag 2P in memory 14 of information processing apparatus 3, information processing apparatus 3 and tag 2P can be associated with each other, different processing can be performed as game processing in a specific apparatus, and zest of processing using a tag can be enhanced.

Though a case that prescribed event processing is performed when a specific ID of tag 2P registered in memory 14 of information processing apparatus 3 matches with a specific ID of an accessed tag has been described in the present example, it may be performed under another scheme without being particularly limited to that scheme.

For example, prescribed event processing may be performed when identification information (ID) of information processing apparatus 3 registered in accessed tag 2P and identification information (ID) of information processing apparatus 3 which accesses tag 2P match with each other.

Alternatively, prescribed event processing may be performed when user account information (user identification information) registered in tag 2P matches with user account information saved in advance in memory 14 of information processing apparatus 3 which accesses tag 2P.

(Modification of Configuration of Information Processing System)

When tag 2 has an information processing portion in another embodiment, a part of processing performed in information processing apparatus 3 may be performed on a side of tag 2. For example, (a part or the entirety of) processing in communication control unit 32 may be performed by the information processing portion of tag 2. In the embodiment above, communication control unit 32 actually reads data from tag 2 and communication control unit 32 manages passing of data to application portion 31 so as to restrict reading of data from tag 2 by application portion 31. In contrast, when processing in communication control unit 32 is performed on the side of tag 2, reading of data from tag 2 by information processing apparatus 3 is actually restricted.

An application executable by a personal computer may be provided as a program in the present embodiment. Here, the program according to the present embodiment may be incorporated as a partial function (a module) of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program executed by a computer capable of near field wireless communication with an information storage medium, the information processing program comprising instructions that cause the computer to:
   read first data from the information storage medium by establishing near field wireless communication with the information storage medium, wherein the information storage medium includes a read-only data portion configured to store a character identifier for a video game character;
   execute a first video game application program that includes instructions to:
      read, using near field wireless communication, the character identifier from the information storage medium,
      generate the video game character in a virtual space and process inputs provided by a user to control the video game character as part of the first video game application program, and
      process user input that allows a user of the first video game application program to interact with or control a first virtual object, which is different from the video game character, used in the first video game application program, the interaction or control of the first virtual object creating, based on the read first data, second data;
   write the created second data into the information storage medium by establishing near field wireless communication with the information storage medium; and
   execute a second video game application program that includes instructions to:
      generate, by using the second data read from the information storage medium by using near field wireless communication, a version of the first virtual object that is not controllable by a user of the second video game application program and use the version of the first virtual object in the second video game application program.

2. The non-transitory storage medium according to claim 1, wherein the second data includes environmental data.

3. The non-transitory storage medium according to claim 2, wherein the environmental data is design data having a content displayed as a result of execution of the second video game application program.

4. The non-transitory storage medium according to claim 3, wherein the environmental data is design data in a virtual space displayed as a result of execution of the second video game application program.

5. The non-transitory storage medium according to claim 2, wherein the environmental data is data displayed in connection with a character arranged in a virtual space as a result of execution of the first video game application program.

6. The non-transitory storage medium according to claim 5, wherein the environmental data is data representing a configuration of the virtual space.

7. The non-transitory storage medium according to claim 1, wherein the interaction or control of the first virtual object includes reception of a selection input from the user, where the second data is generated in accordance with the selection input.

8. The non-transitory storage medium according to claim 7, wherein the selection input corresponds to at least one of a plurality of parts relating to a displayed content as a result of execution of the first video game application program, wherein the second data is generated in accordance with the at least one of the plurality of parts that corresponds to the selection input.

9. The non-transitory storage medium according to claim 1, wherein the second data is generated as part of data generated by using the first data as a result of execution of the first video game application program.

10. The non-transitory storage medium according to claim 1, wherein the information storage medium is RFID.

11. The non-transitory storage medium according to claim 1, wherein the information storage medium is an RF tag.

12. The non-transitory storage medium according to claim 1, wherein the near field wireless communication is NFC wireless communication.

13. The non-transitory storage medium according to claim 1, wherein the first video game application program and the second video game application program are game programs different from each other.

14. The non-transitory storage medium according to claim 1,
   wherein the information storage medium is disposed with a movable structure that includes a physical depiction that is visible to the user, the physical depiction corresponding to the video game character,
   the movable structure is movable by the user to be within range of the computer to establish near field wireless communication with the information storage medium contained therein.

15. The non-transitory storage medium according to claim 14, wherein the created second data is written to the information storage medium in correspondence with an application identifier that is also stored on the information storage medium, the stored application identifier corresponding to the first application program, wherein data stored on the information storage medium in correspondence with the application identifier is not updated based on execution of the second application program.

16. An information processing apparatus capable of near field wireless communication with an information storage medium, the information processing apparatus comprising:
a near field wireless communication transceiver configured to:
read first data from the information storage medium by establishing near field wireless communication with the information storage medium, wherein the information storage medium includes a read-only data portion configured to store a character identifier for an video game character; and
write second data to the information storage medium by establishing near field wireless communication with the information storage medium;
a processing system that includes at least one hardware processor, the processing system configured to:
execute a first video game application program that includes instructions to:
1) obtain the character identifier from the information storage medium,
2) generate the video game character in a virtual space that is part of the video game of the first video game application program and process inputs provided by a user to control the video game character, and
3) process user input that allows a user of the first video game application program to interact with or control a first virtual object, which is different from the video game character, used in the first video game application program, the interaction or control of the first virtual object creating, based on the read first data, second data that is then written to the information storage medium; and
execute a second video game application program that includes instructions to generate, by using the second data read from the information storage medium via the near field wireless communication transceiver, a version of the first virtual object that is not controllable by a user of the second video game application program and use the version of the first virtual object in the second video game application program,
where the character identifier is stored in memory of the information storage medium that is non-writable by either the first or second video game application programs.

17. An information processing system, comprising;
an information storage medium that includes a non-transitory storage medium readable and writable using near field wireless communication, wherein the information storage medium includes a read-only data portion configured to store a character identifier for a video game character; and
an information processing apparatus capable of near field wireless communication with the information storage medium,
the information processing apparatus including a near field wireless communication transceiver and a processing system that includes at least one hardware processor;

the near field wireless communication transceiver configured to:
read first data from the information storage medium by establishing near field wireless communication with the information storage medium; and
write second data to the information storage medium by establishing near field wireless communication with the information storage medium;
the processing system configured to:
execute a first video game application program that includes instructions to:
1) obtain the character identifier from the information storage medium,
2) generate, based on the obtained character identifier, the video game character in a virtual space that is part of the video game of the first video game application program and process inputs provided by a user to control the video game character, and
3) process user input that allows a user of the first video game application program to interact with or control a first virtual object, which is different from the video game character, used in the first video game application program, the interaction or control of the first virtual object creating, based on the read first data, second data that is then written to the information storage medium; and
execute a second video game application program that includes instructions to generate, by using the second data read from the information storage medium via the near field wireless communication transceiver, a version of the first virtual object that is not controllable by a user of the second video game application program and use the version of the first virtual object in the second video game application program,
where the character identifier is stored in memory of the information storage medium that is non-writable by either the first or second video game application programs.

18. The information processing system of claim 17, wherein the second video game application program includes instructions further configured to, by using the processing system, control another virtual object in response to received user input while the version of the first virtual object is being used and displayed on a display screen that is coupled to the processing system.

19. The information processing system of claim 18, wherein the version of the first virtual object is part of the background of images generated and displayed on the display screen.

20. The information processing system of claim 17, wherein the first and second video game application programs are different video game application programs.

21. The information processing apparatus of claim 17, wherein:
the information storage medium is included with a movable structure that includes a physical depiction that corresponds to the video game character that is visible to the user as part of the movable structure,
the movable structure is movable by the user to be within range of the near field wireless communication transceiver to establish near field wireless communication with the information storage medium that is disposed with the movable structure.

22. A method of controlling an information processing apparatus that includes at least one hardware processor, the information processing apparatus capable of communicating with an information storage medium using near field wireless communication, the method comprising:
  reading, by establishing near field wireless communication with the information storage medium, first data from the information storage medium;
  executing, by using the at least one hardware processor, a first video game application program;
  as part of execution of the first video game application program:
    1) reading, using near field wireless communication, the character identifier from the information storage medium,
    2) generating the video game character in a virtual space and process inputs provided by a user to control the video game character as part of the first video game application program, and
    3) processing user input that allows a user of the first video game application program to interact with or control a first virtual object, which is different from the video game character, of the first video game application program, the interaction or control of the first virtual object generating, based on the read first data, second data;
  writing the generated second data into the information storage medium by establishing near field wireless communication with the information storage medium;
  executing, by using the at least one hardware processor, a second video game application program different from the first video game application program; and
  as part of execution of the second video game application program, using the second data read from the information storage medium via the near field wireless communication transceiver, a version of the first virtual object that is not controllable by a user of the second video game application program and displaying the version of the first virtual object as part of images generated and displayed with the second video game application program,
  wherein the information storage medium is disposed with a movable structure that includes a physical depiction that is visible to a user, the physical depiction being associated with the first virtual object used in the first video game application program,
  the movable structure is movable by the user to be within range of the computer to establish near field wireless communication with the information storage medium.

* * * * *